United States Patent
Sharma et al.

(10) Patent No.: US 8,380,558 B1
(45) Date of Patent: Feb. 19, 2013

(54) METHOD AND SYSTEM FOR ANALYZING SHOPPING BEHAVIOR IN A STORE BY ASSOCIATING RFID DATA WITH VIDEO-BASED BEHAVIOR AND SEGMENTATION DATA

(75) Inventors: Rajeev Sharma, State College, PA (US); Satish Mummareddy, Washington, DC (US); Jeff Hershey, Norfolk, VA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 1209 days.

(21) Appl. No.: 11/999,717

(22) Filed: Dec. 6, 2007

Related U.S. Application Data

(60) Provisional application No. 60/876,411, filed on Dec. 21, 2006.

(51) Int. Cl.
*G06Q 10/00* (2012.01)
*H04N 5/225* (2006.01)

(52) U.S. Cl. .......................................... 705/7.29; 348/69
(58) Field of Classification Search ................. 705/10, 705/14, 7.29; 348/169
See application file for complete search history.

(56) References Cited

U.S. PATENT DOCUMENTS

| | | | | | |
|---|---|---|---|---|---|
| 5,745,036 | A | * | 4/1998 | Clare | 340/572.1 |
| 5,966,696 | A | * | 10/1999 | Giraud | 705/14.41 |
| 6,301,370 | B1 | * | 10/2001 | Steffens et al. | 382/103 |
| 6,407,762 | B2 | * | 6/2002 | Leavy | 715/862 |
| 6,430,357 | B1 | * | 8/2002 | Orr | 386/244 |
| 6,502,076 | B1 | * | 12/2002 | Smith | 705/14.54 |
| 6,724,308 | B2 | * | 4/2004 | Nicholson | 340/572.1 |
| 6,791,603 | B2 | * | 9/2004 | Lazo et al. | 348/169 |
| 6,989,741 | B2 | * | 1/2006 | Kenny et al. | 340/505 |
| 6,998,987 | B2 | * | 2/2006 | Lin | 340/573.1 |
| 7,006,982 | B2 | * | 2/2006 | Sorensen | 705/7.29 |
| 7,053,775 | B2 | * | 5/2006 | Moore | 340/572.1 |
| 7,091,863 | B2 | * | 8/2006 | Ravet | 340/572.1 |
| 7,098,793 | B2 | * | 8/2006 | Chung | 340/572.1 |
| 7,116,230 | B2 | * | 10/2006 | Klowak | 340/572.1 |
| 7,319,479 | B1 | * | 1/2008 | Crabtree et al. | 348/169 |
| 7,590,261 | B1 | * | 9/2009 | Mariano et al. | 382/103 |
| 7,636,456 | B2 | * | 12/2009 | Collins et al. | 382/118 |
| 7,862,425 | B2 | * | 1/2011 | Cavagna | 463/25 |

(Continued)

OTHER PUBLICATIONS

U.S. Appl. No. 60/833,031, Sharma, et al.

(Continued)

*Primary Examiner* — Firmin Backer
*Assistant Examiner* — Michael A Chambers

(57) ABSTRACT

The present invention is a method and system for analyzing shopping behavior by associating RFID data, such as tracking data by the RFID tag identifications, with video-based behavior and segmentation data, such as behavior analysis and demographic composition analysis of the customers, utilizing a plurality of means for sensing and using RFID tags, a plurality of means for capturing images, and a plurality of computer vision technologies. In the present invention, the association can further comprise the association of the RFID with the transaction data or any time-based measurement in the retail space. The analyzed shopping behavior in the present invention helps people to better understand business elements in a retail space. It is one of the objectives of the present invention to provide an automatic video-based segmentation of customers in the association with the RFID based tracking of the customers, based on a novel usage of a plurality of means for capturing images and a plurality of computer vision technologies on the captured visual information of the people in the retail space. The plurality of computer vision technologies can comprise face detection, person tracking, body parts detection, and demographic classification of the people, on the captured visual information of the people in the retail space.

14 Claims, 18 Drawing Sheets

U.S. PATENT DOCUMENTS

| | | | | |
|---|---|---|---|---|
| 2001/0031073 A1* | 10/2001 | Tajima | | 382/118 |
| 2001/0036298 A1* | 11/2001 | Yamada et al. | | 382/118 |
| 2002/0178085 A1* | 11/2002 | Sorensen | | 705/26 |
| 2002/0184098 A1* | 12/2002 | Giraud et al. | | 705/14 |
| 2003/0002712 A1* | 1/2003 | Steenburgh et al. | | 382/103 |
| 2003/0107649 A1* | 6/2003 | Flickner et al. | | 348/150 |
| 2003/0108223 A1* | 6/2003 | Prokoski | | 382/115 |
| 2003/0123713 A1* | 7/2003 | Geng | | 382/118 |
| 2006/0010027 A1* | 1/2006 | Redman | | 705/10 |
| 2006/0217185 A1* | 9/2006 | Cavagna | | 463/25 |
| 2006/0239645 A1* | 10/2006 | Curtner et al. | | 386/95 |
| 2008/0243614 A1* | 10/2008 | Tu et al. | | 705/14 |

OTHER PUBLICATIONS

U.S. Appl. No. 60/808,283, Sharma, et al.

* cited by examiner

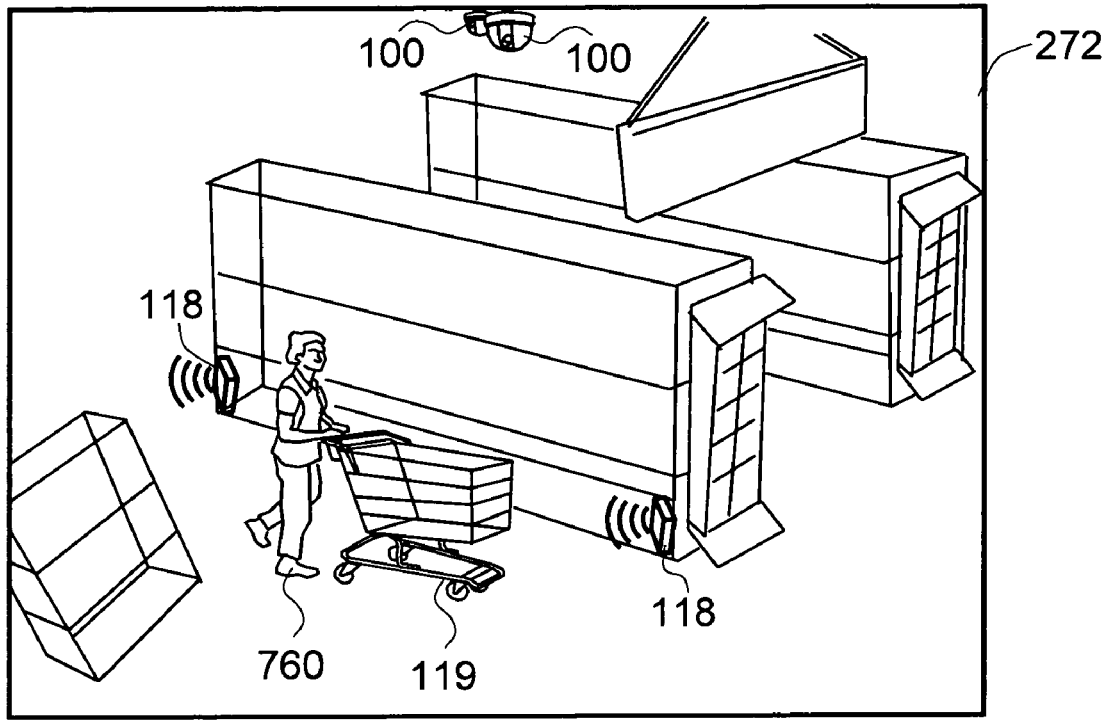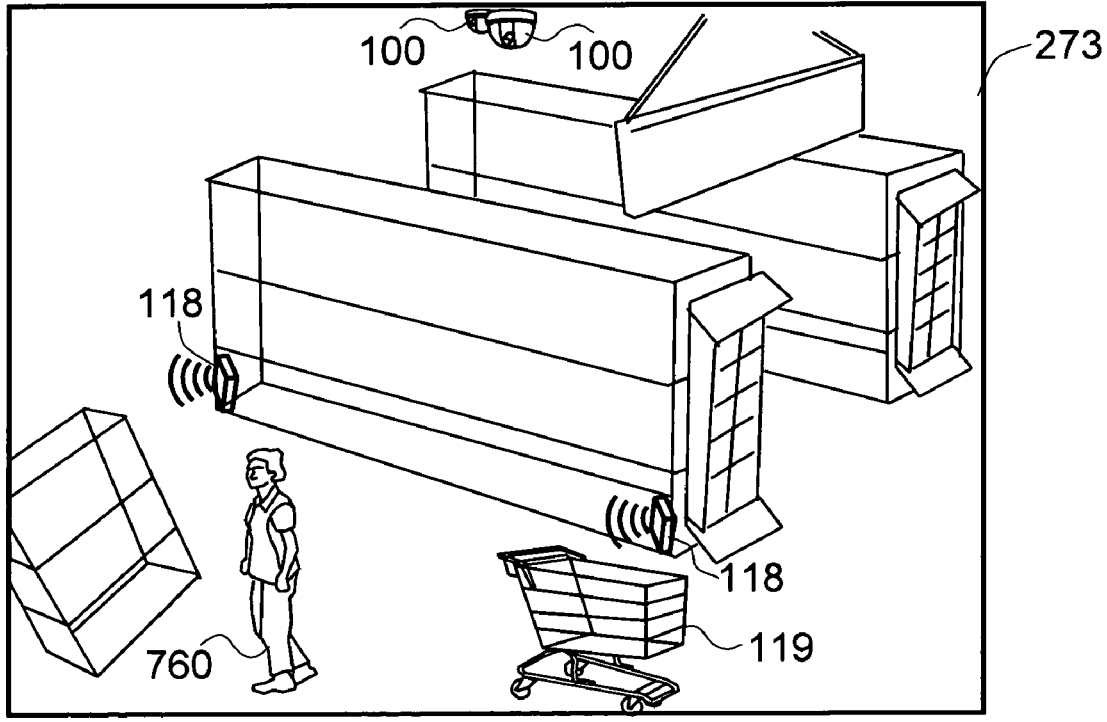
Fig. 9

| CUST. AT W1 | RFID TRACKING DURING WINDOW OF TIME W1 (T1~Tn) | | | | | |
|---|---|---|---|---|---|---|
| CUST. 1 | (TG1, RC1,Tin) | (TG1, RC2,T) | (TG1, RC2,T) | ... | | (TG1, RC5,Tout) |
| CUST. 2 | (TG2, RC1,Tin) | (TG2, RC2,T) | (TG2, RC3,T) | ... | (TG2, RC4,T) | (TG2, RC4,Tout) |
| ⋮ | ... | | | | | |
| CUST. i-1 | (TGi-1, RC2,Tin) | (TGi-1, RC7,T) | | ... | (TGi-1, RC3,T) | (TGi-1, RC1,Tout) |
| CUST. i | (TGi, RC5,Tin) | (TGi, RC1,T) | | ... | (TGi, RC6,T) | (TGi, RC2,Tout) |

⋮

| CUST. AT Wp | RFID TRACKING DURING WINDOW OF TIME Wp (Tp1~Tpn) | | | | | |
|---|---|---|---|---|---|---|
| CUST. k | (TGk, RC5,Tin) | (TGk, RC4,T) | (TGk, RC3,T) | ... | | (TGk, RC5,Tout) |
| ⋮ | ... | | | | | |
| CUST. m-1 | (TGm-1, RC7,Tin) | (TGm-1, RC6,T) | | ... | (TGm-1, RC4,T) | (TGm-1, RC1,Tout) |
| CUST. m | (TGm, RC7,Tin) | (TGm, RC7,T) | | ... | (TGm, RC2,T) | (TGm, RC2,Tout) |
| ⋮ | ... | | | | | |
| CUST. n | (TGn, RC3,Tin) | (TGn, RC1,T) | | ... | (TGn, RC2,T) | (TGn, RC7,Tout) |

PERSON NO #

(TAG #, REC. #, REC. LOC., T) (TAG #, REC. #, REC. LOC., T) ••• (TAG #, REC. #, REC. LOC., T)

••• (TAG #, REC. #, REC. LOC., T)

TAG #: TAG ID NUMBER
REC. #: RECEIVER ID NUMBER
REC. LOC.: RECEIVER LOCATION
T: TIMESTAMP ASSOCIATION

Fig.11

| INTERACTION DESCRIPTION | SHOPPING INTERACTION LEVELS |
|---|---|
| PASSING BY NO CHANGE IN VELOCITY | LEVEL 1 |
| NOTICING SLOWING DOWN + REGAIN VELOCITY | LEVEL 2 |
| STOPPING | LEVEL 3 |
| ENGAGING 1 STOPPING FOR N>T1 SECONDS ... ENGAGING P-1 STOPPING FOR N>TP-1 SECONDS | LEVEL 4 ... LEVEL P-1 |
| PURCHASE | LEVEL P |

Fig. 12

| SECTION 1 | TIME | | | | | | 610 |
|---|---|---|---|---|---|---|---|
| | T1 | T2 | T3 | | Tn-1 | Tn | |
| BEHAVIOR CLASS | CLASS 1 | 45% | 47% | 50% | ... | 52% | 56% |
| | CLASS 2 | 35% | 28% | 34% | ... | 40% | 42% |
| | CLASS 3 | 20% | 25% | 16% | ... | 8% | 2% |

UNIT: %

⋮

| SECTION N | TIME | | | | | | 611 |
|---|---|---|---|---|---|---|---|
| | T1 | T2 | T3 | | Tn-1 | Tn | |
| BEHAVIOR CLASS | CLASS 1 | 30% | 32% | 35% | ... | 33% | 30% |
| | CLASS 2 | 20% | 28% | 34% | ... | 26% | 22% |
| | CLASS 3 | 50% | 40% | 31% | ... | 41% | 48% |

UNIT: %

Fig. 13

| TO FROM | SEC. 1 | SEC. 2 | SEC. 3 | SEC. 4 | SEC. 5 | ... | SEC. 14 | SEC. 15 |
|---|---|---|---|---|---|---|---|---|
| SEC. 1 |  | 394 | 514 | 130 | - | ... | - | - |
| SEC. 2 | 21 |  | 338 | 321 | - | ... | - | - |
| SEC. 3 | 57 | 123 |  | 212 | 328 | ... | - | - |
| SEC. 4 | 21 | 384 | 63 |  | 483 | ... | - | - |
| SEC. 5 | - | - | 38 | 356 |  | ... | - | - |
| ... | ... | ... | ... | ... | ... | ... | ... | ... |
| SEC. 14 | - | - | - | - | - | ... |  | 230 |
| SEC. 15 | - | - | - | - | - | ... | 824 |  |

| CUST. AT W1 | BEHAVIOR MEASUREMENT DURING WINDOW OF TIME W1 (T1~Tn) | | | | | |
|---|---|---|---|---|---|---|
| CUST. 1 | (C1,PB, P1) | (C2,PB, P2) | (C3,L2, P3) | ... | (C4,PB, P4) | |
| CUST. 2 | (C1,PB, P1) | (C3,L2, P3) | (C2,PB, P2) | ... | (C4,PB, P4) | (C5,L3, P5) |
| ⋮ | | | ... | | | |
| CUST. I-1 | | (C1,PB, P1) | (C4,L2, P4) | ... | (C3,PB, P3) | (C3,PB, P3) |
| CUST. I | (C4,PB, P4) | (C3,L3, P3) | (C2,L2, P2) | (C1,PB, P1) | | |

⋮

| CUST. AT Wp | BEHAVIOR MEASUREMENT DURING WINDOW OF TIME Wp (T1~Tn) | | | | | |
|---|---|---|---|---|---|---|
| CUST. 1 | (C2,PB, P2) | (C3,PB, P3) | (C1,L2, P1) | ... | (C1,PB, P1) | |
| ⋮ | | | ... | | | |
| CUST. J-1 | | (C1,PB, P1) | (C3,L2, P3) | ... | (C4,L2, P4) | (C5,PB, P5) |
| CUST. J | (C2,PB, P2) | (C1,PB, P1) | (C3,L2, P3) | ... | (C4,PB, P4) | |
| ⋮ | | | ... | | | |
| CUST. K | | (C3,L3, P3) | (C2,PB, P2) | ... | (C1,PB, P1) | (C3,PB, P3) |

Fig. 15

| SECTION 1 | TIME | | | | | | 612 |
|---|---|---|---|---|---|---|---|
| | T1 | T2 | T3 | | Tn-1 | Tn | |
| DEMOGRPHIC CLASS | CLASS 1 | 40% | 43% | 50% | ... | 52% | 56% |
| | CLASS 2 | 35% | 28% | 32% | ... | 40% | 39% |
| | CLASS 3 | 25% | 29% | 18% | ... | 8% | 5% |

UNIT: %

⋮

| SECTION N | TIME | | | | | | 613 |
|---|---|---|---|---|---|---|---|
| | T1 | T2 | T3 | | Tn-1 | Tn | |
| DEMOGRPHIC CLASS | CLASS 1 | 35% | 32% | 35% | ... | 33% | 33% |
| | CLASS 2 | 25% | 28% | 34% | ... | 27% | 22% |
| | CLASS 3 | 40% | 40% | 31% | ... | 40% | 45% |

UNIT: %

Fig. 16

DATE, TIME AND LANE NUMBER PROVIDE THE
INFORMATION TO LINK A TRANSACTION WITH THE
CORRESPONDING SHOPPING TRIP AND BEHAVIOR DATA

~667

| DATE | TIME | STORE | LN | CASHIER | MEMBER ID | QTY & WEIGHT | COST | DISC. | MAR. | DEPT. | ITEM UPC |
|---|---|---|---|---|---|---|---|---|---|---|---|
| 11/3/2006 | 9:00:00 AM | 5 | 11 | 205 | 480013926611 | 1 | 0.49 | 1.07 | 0.00 | 0.51 | 5 | 000020300200000 |
| 11/3/2006 | 9:00:00 AM | 5 | 11 | 205 | 480013926611 | 1 | 0.75 | 1.64 | 0.00 | 0.78 | 5 | 000020300200000 |
| 11/3/2006 | 9:00:00 AM | 5 | 11 | 205 | 480013926611 | 1 | 3.12 | 6.21 | 0.00 | 2.81 | 5 | 000020353000000 |
| 11/3/2006 | 9:00:00 AM | 5 | 11 | 205 | 480013926611 | 1 | 0.00 | 0.99 | 0.10 | 0.28 | 1 | 000007493111005 |
| 11/3/2006 | 9:00:00 AM | 5 | 11 | 205 | 480013926611 | 1 | 0.73 | 0.65 | 0.00 | 0.30 | 4 | 000000000004074 |
| 11/3/2006 | 9:00:00 AM | 5 | 11 | 205 | 480013926611 | 1 | 0.00 | 1.29 | 0.40 | 0.66 | 11 | 000688267006810 |
| 11/3/2006 | 9:00:00 AM | 5 | 11 | 205 | 480013926611 | 1 | 0.00 | 1.29 | 0.40 | 0.66 | 11 | 000688267006810 |
| 11/3/2006 | 9:00:00 AM | 5 | 11 | 205 | 480013926611 | 1 | 0.00 | 1.03 | 0.05 | 0.34 | 13 | 000029000000766 |
| 11/3/2006 | 9:00:00 AM | 5 | 11 | 205 | 480013926611 | 1 | 0.00 | 1.03 | 0.05 | 0.34 | 13 | 000029000000766 |
| 11/3/2006 | 9:00:00 AM | 5 | 11 | 205 | 480013926611 | 1 | 0.00 | 3.49 | 0.25 | 1.12 | 11 | 000072180633980 |
| 11/3/2006 | 9:00:00 AM | 5 | 11 | 205 | 480013926611 | 4 | 0.00 | -0.12 | 0.00 | 0.00 | 90 | 000000000009872 |
| 11/3/2006 | 9:00:00 AM | 5 | 11 | 205 | 480013926611 | 1 | 0.51 | 2.03 | 0.25 | 1.52 | 27 | 000000000004469 |
| 11/3/2006 | 9:00:00 AM | 5 | 11 | 205 | 480013926611 | 1 | 0.00 | 0.49 | 0.05 | 0.16 | 1 | 000688267034500 |

Fig.17

METHOD AND SYSTEM FOR ANALYZING SHOPPING BEHAVIOR IN A STORE BY ASSOCIATING RFID DATA WITH VIDEO-BASED BEHAVIOR AND SEGMENTATION DATA

CROSS-REFERENCE TO RELATED APPLICATIONS

This application claims the benefit of U.S. Provisional Patent Application No. 60/876,411, filed Dec. 21, 2006.

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system for analyzing shopping behavior by associating RFID data, such as tracking data by the RFID tag identifications, with video-based behavior and segmentation data, such as behavior analysis or demographic composition analysis of the customers, in a preferred embodiment, wherein the analyzed shopping behavior helps gain deeper insights in a retail space, using a plurality of means for sensing and using RFID tags, a plurality of means for capturing images, and a plurality of computer vision technologies.

2. Background of the Invention

There have been attempts to use the Radio Frequency IDentification (RFID) technology for tracking non-human objects or persons in the prior art.

U.S. Pat. No. 6,989,741 of Kenny, et al. (hereinafter Kenny) disclosed a method for locating and tracking an object that is attached by an electronic tag, E-Tag, based on the RFID technology and triangulation technology. U.S. Pat. No. 7,053,775 of Moore disclosed a method and apparatus for tracking items automatically using a passive RFID and remote sensing antennas. U.S. Pat. No. 7,091,863 of Ravet disclosed a method and apparatus for tracking the movement and location of an object in a predefined area using at least one readable sensor and at least one reader at a preselected location. U.S. Pat. No. 7,098,793 of Chung disclosed a method and apparatus for tracking objects employing smart tags, which utilized contact-less radio-frequency (RF) transmissions. U.S. Pat. No. 7,116,230 of Klowak disclosed a system for asset location using asset tags, which transmit radio frequency.

Although these prior arts show various approaches of applying the RFID technology to tracking application for various objects, they are clearly foreign to the concept of associating the RFID technology with the computer vision based automatic tracking technology. Furthermore, they are clearly foreign to the idea of associating the RFID technology with the computer vision based demographic composition information of customers, shopping behavior analysis of the customers, and the transaction data in a retail environment.

U.S. Pat. No. 6,154,139 of Heller disclosed a method and apparatus for utilizing both the RFID and infrared (IR) parts of the electromagnetic spectrum to locate subjects in a tracking environment. Heller is foreign to the computer vision technologies. Heller is further foreign to the concept of combining the computer vision technologies with the RFID for analyzing the customers' behavior and associating the demographics and transaction data of the customers to the RFID, especially in a shopping environment.

U.S. Pat. No. 6,724,308 of Nicholson disclosed a method for multi-functional RFID tag assemblies, passive repeater systems, and modular antenna systems to track containers and products. With this approach, Nicholson tried to overcome the weaknesses in the RFID technologies, such as the disruption of the communication of the antenna with the RFID tags due to the objects that pass through the antenna field range. Nicholson is clearly foreign to the idea of associating the RFID technology with another technology, such as the computer vision technology, for analyzing the customers' shopping behaviors. Nicholson is also clearly foreign to the idea of associating the RFID technology with the transaction data of the customers in a retail establishment. Nicholson is further foreign to the idea of tracking customers rather than tracking only containers and products. This is partially due to the fact that it is inconvenient and impractical to attach the RFID tags to the customers and rely only on the RFID tags for the customers' tracking, which otherwise could be handled in an easier and more practical manner in the computer vision technology applications using the visual images of the customers.

U.S. Pat. No. 6,791,603 of Lazo, et al. (hereinafter Lazo) disclosed a system for event driven video tracking system, where the RFID is used as an event initiation method. In Lazo, the sensed event triggered the video tracking of the asset that was associated with the RFID tag, from zone to zone, within a controlled location in a surveillance application. Lazo did not explicitly describe any method for an automatic video tracking using a computer vision based tracking technology. Lazo is also foreign to the automatic demographic analysis of the customers using the visual images of the customers. Therefore, Lazo cannot explain about the novel usage of computer vision technology for analyzing shopping behavior and demographic composition of the customers in a retail establishment in association with the RFID tracking information. Lazo is further foreign to the concept of associating the transaction data in the retail environment to the customers' shopping behavior based on the tracking information by the RFID and the computer vision technology.

U.S. Pat. No. 6,998,987 of Lin disclosed a surveillance system that integrates RFID and video tracking. Although Lin briefly mentioned the video tracker identifies objects within scenes based on a variety of visual features, such as a group of pixels having a particular aspect ratio, corresponding to the color and composition of a typical face, or corresponding to the structure of lines or corners of an object, Lin did not explicitly describe how the video tracking can be used for shopping behavior analysis of shoppers or customers in a retail environment in association with the RFID information. Lin is further foreign to the concept of associating RFID tracking information with the demographic composition of the customers in a retail establishment or the transaction data of the customers in the retail environment utilizing the tracking information by the RFID and the computer vision technology.

The prior arts are also foreign to the concept of correlating the multiple associations of the RFID based tracking, the video-based analysis, and other temporal data, without using a large number of means for capturing images. The present invention can correlate the plurality of associations and provide an entire shopping path analysis of a customer according to the time sequence, and the correlation process can reduce the cost for hardware in a store by installing the means for

SUMMARY

The present invention is a method and system for analyzing shopping behavior by associating RFID data, such as tracking data by the RFID tag identification proximity detection, with video-based behavior and segmentation data, in a preferred embodiment.

The video-based behavior and segmentation data can comprise automatic behavior analysis and demographic composition analysis of the customers.

The present invention uses a plurality of means for sensing and using RFID tags, a plurality of means for capturing images, and a plurality of computer vision technologies, and the present invention is called behavior and RFID based store analysis (BRS).

It is an objective of the present invention to associate the RFID based proximity detection of the customers with the automatic video-based behavior analysis of the customers, in an embodiment.

However, the association in present invention is not limited to the association of the behavior analysis of the customers with the RFID based tracking information. It is another objective of the present invention that the association in the present invention further comprises the association of the RFID with the other automatic video-based segmentation of customers, such as demographic composition analysis of the customers.

It is a further objective of the present invention that the association in the present invention further comprises the customers' shopping transaction data at the counter.

It is a further objective of the present invention that the association in the present invention further comprises any time-based measurement provided in the retail space, such as loyalty card data and survey data.

It is a further objective of the present invention to provide a novel usage of a plurality of means for capturing images and a plurality of computer vision technologies on the captured visual information of the people in the retail space for the association of the automatic video-based behavior analysis and segmentation of customers with the RFID based tracking of the customers. The plurality of computer vision technologies can comprise face detection, person tracking, body parts detection, and demographic classification of the people, on the captured visual information of the people in the retail space.

It is a further objective of the present invention to process the association between the RFID based tracking and the video-based analysis without using a large number of means for capturing images, such as cameras, which could cover the entire store, yet the present invention provides entire shopping analysis of the customers in the store through the correlation of the associations. The idea behind this objective is to reduce the cost of installing such a large number of means for capturing images.

It is a further objective of the present invention to help improve the actual quality and depth of information through the novel usages of the RFID and computer vision technologies.

It is an objective of the present invention to analyze the business elements in a retail space, such as sections, based on the analyzed shopping behavior.

The term "section" is defined as a logical element, which can comprise one or a plurality of business components, such as products, product types, areas in a store, displays, departments, or anything that can be made as a unit with a characteristics in a retail space in the present invention. As described, the component, such as areas in a store, in a section is not necessarily a singleton. For example, a section is not necessarily a group of spatially connected areas in a store. Multiple spatially disconnected sub-areas in a store can form a section.

Behavior and RFID Based Store Analysis

The behavior and RFID based store analysis in the present invention represents a comprehensive solution that provides an unmatched combination of store-wide insights, section, aisle and shelf level behavioral data and association with transaction information.

This solution leverages the strengths of several technologies to provide its high value. In an exemplary embodiment of the present invention, the solution can use passive RFID tags and readers to construct overall shopping behavior or shopping trip data based on the sequence of aisles or areas shopped. The RFID portion of the solution also provides for highly accurate and reliable association with other data—namely POS transaction data, loyalty card data and other "basket analysis" information.

To gather the aisle, section and shelf level details, video-based technologies are employed that automatically extract key shopper behavior data at a level of granularity not possible with RFID technology. This detailed information is then associated with both the store-wide shopping trip data as well as the transaction data.

The key strengths of this solution lie not only in its ability to deliver multiple levels or layers of shopper behavior data, but to link these levels of data in a logical way for the purpose of gaining deeper insights by:

Understanding aisle, section or shelf level behaviors in the context of the overall shopping trip Understanding differences in aisle, section or shelf level behaviors across various shopper segments such as:

Shopper segments based on certain shopping trip characteristics

Shopper segments based on purchase habits or "basket" characteristics

Shopper segments based on existing loyalty card classifications

The BRS solution enables retailers and manufacturers to take a segmented approach to understanding and influencing in-store behavior. This segmented approach allows them to better serve their various shopper segments by understanding the behavior patterns associated to particular shopper segments. Key segmentation factors include basket size and content and Trip Type or the purpose of the shopping trip. Typical trip types include, stock-up, fill-in and grab-and-go.

The combination of video-based and RFID technologies in BRS, delivers the best of both worlds by providing detailed shopper behaviors that are associated with more global insights in the form of store-wide shopping trip patterns and transaction and loyalty data.

DRAWINGS

Figures

FIG. 9 shows an exemplary RFID tags proximity detection based tracking and its relationship with the video-based measurement in an exemplary embodiment of the present invention.

FIG. 10 shows exemplary tables of a plurality of RFID tracking information for customers during an exemplary window of time.

FIG. 11 shows an exemplary string of RFID tracking information for a customer during an exemplary window of time, which comprises RFID tag ID number, receiver ID number, receiver location information, and timestamp.

FIG. 12 shows an exemplary shopping interaction levels in a retail space that can be used as a criteria for the behavioral analysis of the customers using the computer vision based tracking in regards to the association with the RFID proximity detection.

FIG. 13 shows an exemplary statistics of the behavioral analysis information for each predefined section in a retail space.

FIG. 15 shows an exemplary shopping behavior measurement, based on the association of the RFID proximity detection based tracking and the video-based tracking, among a plurality of sections in a retail space during a plurality of different windows of time through a plurality of exemplary tables for the behavior measurement.

FIG. 16 shows exemplary statistics of the demographic information for each predefined section in a retail space in regards to the association with the RFID proximity detection based tracking and video-based behavior analysis.

FIG. 17 shows an exemplary table for the transaction and loyalty data that can be associated with the behavior analysis in the present invention.

DETAILED DESCRIPTION OF THE INVENTION

Figure 1:
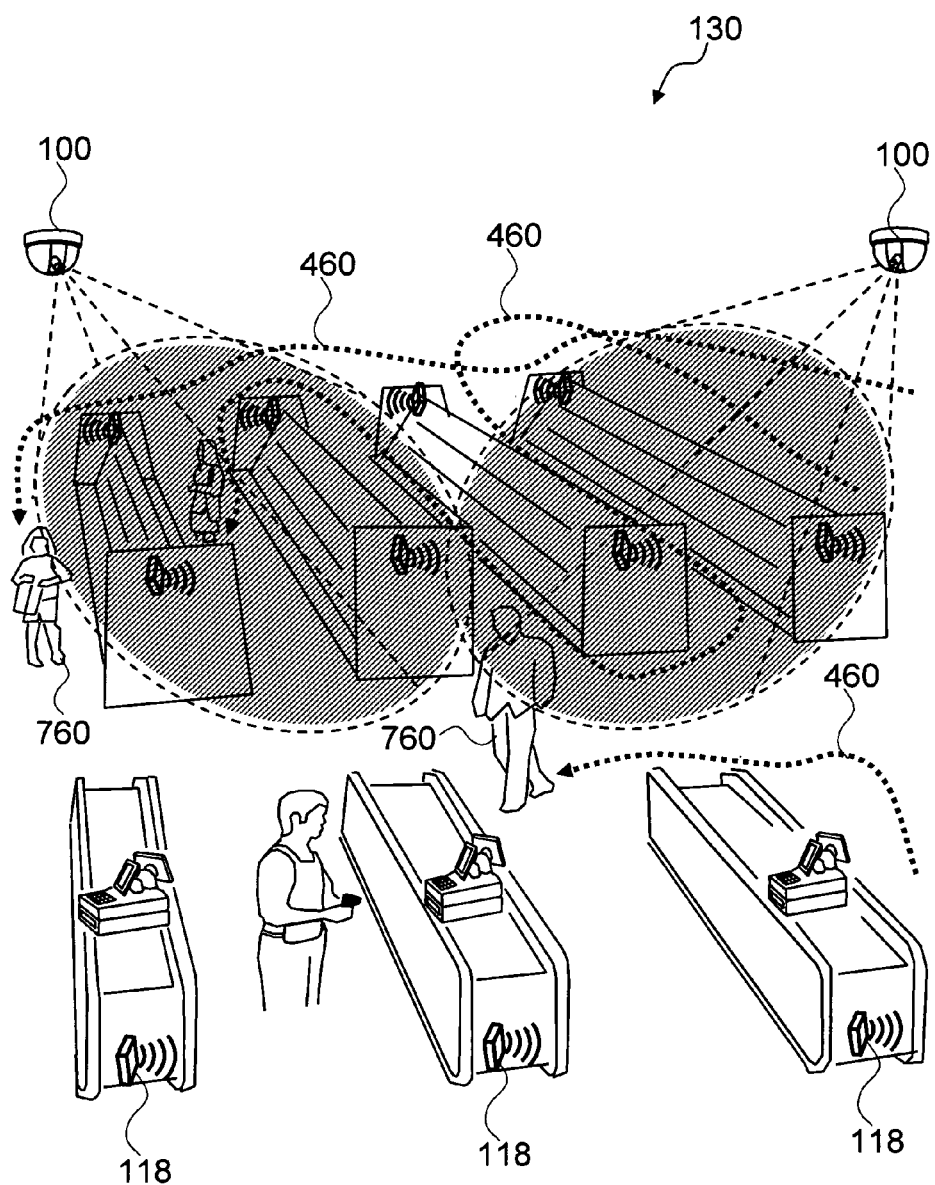
FIG. 1 shows an overview of an exemplary embodiment of the present invention in a retail space, such as a store.

FIG. 1 shows an overview of an exemplary embodiment of the present invention in a retail space 130, such as a store. In the exemplary embodiment, the present invention analyzes shopping behavior of a customer 760 based on the shopping path 460 of the customer 760 by associating RFID data, such as tracking data by the RFID tag identification proximity detection, with video-based behavior and segmentation data, in a preferred embodiment.

The video-based behavior and segmentation data can comprise automatic behavior analysis and demographic composition analysis of the customers, using a plurality of means for sensing and using RFID tags 118, a plurality of means for capturing images 100, and a plurality of computer vision technologies.

The present invention is called behavior and RFID based store analysis (BRS).

It is an objective of the present invention to associate the RFID based proximity detection of the customers with the automatic video-based behavior analysis of the customers, in an exemplary embodiment.

However, the association in present invention is not limited to the association of the behavior analysis of the customers with the RFID based tracking information. It is another objective of the present invention that the association in the present invention further comprises the association of the RFID with the other automatic video-based segmentation of customers, such as demographic composition analysis of the customers.

It is a further objective of the present invention that the association in the present invention further comprises the customers' shopping transaction data at the counter.

It is a further objective of the present invention that the association in the present invention further comprises any time-based measurement provided in the retail space, such as loyalty card data and survey data.

It is a further objective of the present invention to provide a novel usage of a plurality of means for capturing images and a plurality of computer vision technologies on the captured visual information of the people in the retail space for the association of the automatic video-based behavior analysis and segmentation of customers with the RFID based tracking of the customers. The plurality of computer vision technologies can comprise face detection, person tracking, body parts detection, and demographic classification of the people, on the captured visual information of the people in the retail space.

It is a further objective of the present invention to process the association between the RFID based tracking and the video-based analysis without using a large number of means for capturing images, such as cameras, which could cover the entire store, yet the present invention provides entire shopping analysis of the customers in the store through the correlation of the associations. The idea behind this objective is to reduce the cost of installing such a large number of means for capturing images.

It is a further objective of the present invention to help improve the actual quality and depth of information through the novel usages of the RFID and computer vision technologies.

It is an objective of the present invention to analyze the business elements in a retail space, such as sections, based on the analyzed shopping behavior.

The term "section" is defined as a logical element, which can comprise one or a plurality of business components, such as products, product types, areas in a store, displays, departments, or anything that can be made as a unit with a characteristics in a retail space in the present invention. As described, the component, such as areas in a store, in a section is not necessarily a single element. For example, a section is not necessarily a group of spatially connected areas in a store. Multiple spatially disconnected sub-areas in a store can form a section.

Behavior and RFID Based Store Analysis

The behavior and RFID based store analysis in the present invention represents a comprehensive solution that provides an unmatched combination of store-wide insights, section, aisle and shelf level behavioral data and an association with transaction information.

This solution leverages the strengths of several technologies to provide its high value. In an exemplary embodiment of the present invention, the solution can use passive RFID tags and readers to construct overall shopping behavior or shopping trip data based on the sequence of aisles or areas shopped. The RFID portion of the solution also provides for highly accurate and reliable association with other data— namely POS transaction data, loyalty card data, and other "basket analysis" information.

To gather the aisle, section and shelf level details, video-based technologies are employed that automatically extract key shopper behavior data at a level of granularity not possible with RFID technology. This detailed information is then associated with both the store-wide shopping trip data as well as the transaction data.

The key strengths of this solution lie not only in its ability to deliver multiple levels or layers of shopper behavior data, but to link these levels of data in a logical way for the purpose of gaining deeper insights by:

Understanding aisle, section or shelf level behaviors in the context of the overall shopping trip Understanding differences in aisle, section or shelf level behaviors across various shopper segments such as:

Shopper segments based on certain shopping trip characteristics

Shopper segments based on purchase habits or "basket" characteristics

Shopper segments based on existing loyalty card classifications

The BRS solution enables retailers and manufacturers to take a segmented approach to understanding and influencing in-store behavior. This segmented approach allows them to better serve their various shopper segments by understanding the behavior patterns associated to particular shopper segments. Key segmentation factors include basket size and content and trip type or the purpose of the shopping trip. Typical trip types include, stock-up, fill-in and grab-and-go.

The combination of video-based and RFID technologies in BRS, delivers the best of both worlds by providing detailed shopper behaviors that are associated with more global insights in the form of store-wide shopping trip patterns and transaction and loyalty data. Some of the additional strengths in the present invention comprise capability of unobtrusive high resolution tracking of people, shelf level behavior analysis, integrated traffic counting, and differentiation in shopper behavior, using simple infrastructure.

Figure 2:
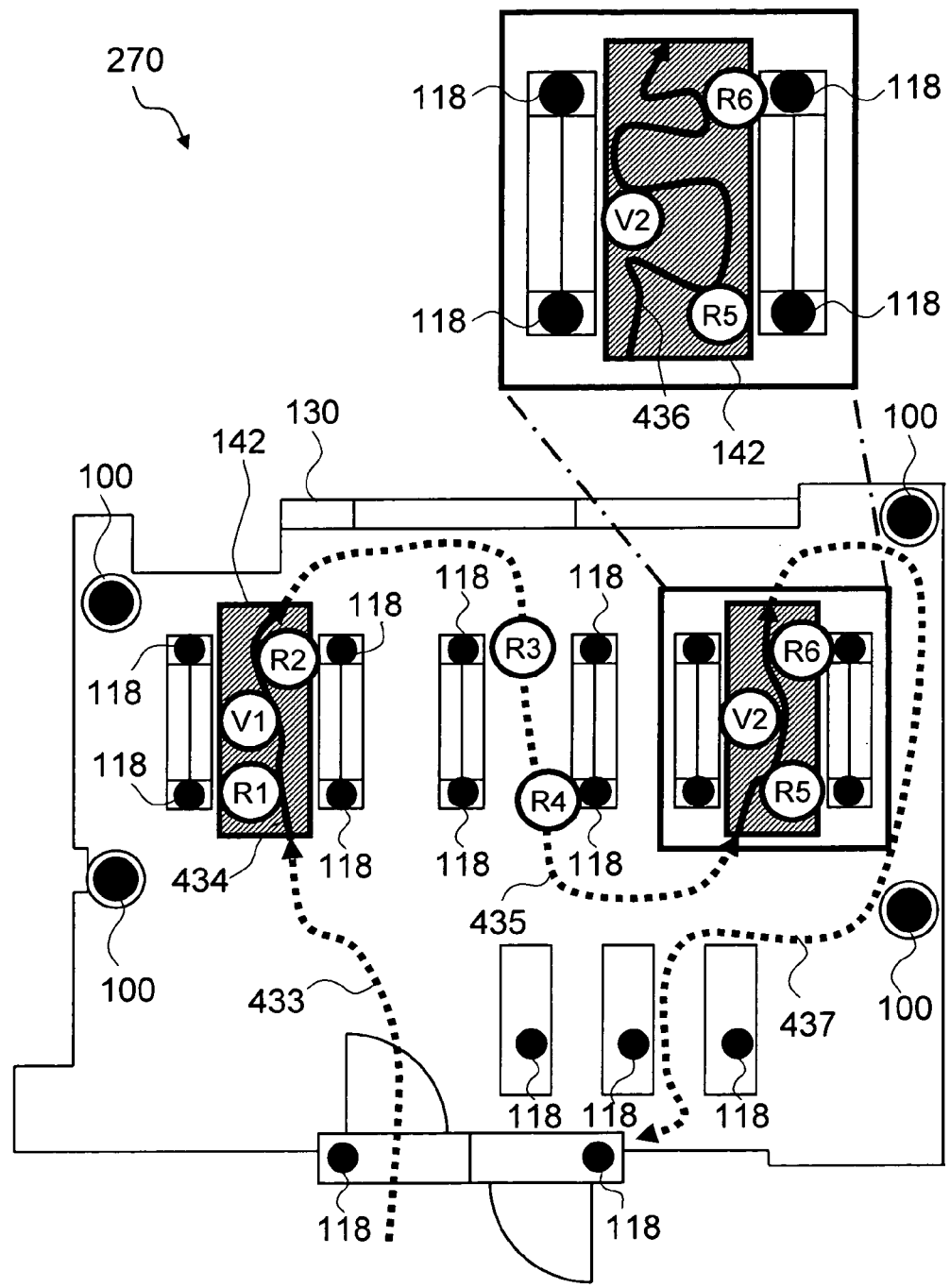
FIG. 2 shows exemplary associations of RFID tags data with partial behavior analyses for a person, and an exemplary correlation of a plurality of such associations for the same person in different locations and different windows of time in an exemplary embodiment of the present invention.

FIG. 2 shows exemplary associations of RFID tags data with partial behavior analyses for a person, and an exemplary correlation of a plurality of such associations for the same person in different locations and different windows of time in an exemplary embodiment of the present invention.

In the exemplary embodiment shown in FIG. 2, the means for sensing and using RFID tags 118, such as the RFID receiver in the present invention, senses the RFID tag identification of a customer while the customer travels around the retail space based on the proximity, and provides the location information and timestamp information, such as the location of the customer at the position R1 at time Tin and position R2 at time Tout.

In the exemplary embodiment shown in FIG. 2, the present invention can also use a plurality of means for capturing images 100 to track the customer and provide the location and timestamp information in the "track segment 2" 434 within the "area covered by the means for capturing images" 142, which includes the tracking information between the start time, Tin, at R1, and the end time, Tout, at R2. Specifically, the tracking information by the plurality of means for capturing images 100, within the "area covered by the means for capturing images" 142, provides continuous tracking information with finer details.

Based on these two measurements, the present invention can associate the vision data with the RFID tag information between the start time, Tin, at R1, and the end time, Tout, at R2. Likewise, the present invention can associate the two measurements in other times, such as the association of RFID with video-based measurements of customers between the start time, Tin, at R5, and the end time, Tout, at R6, shown in FIG. 2.

The present invention can analyze the shopping behavioral pattern of the customer based on the video-based measurements and shopping interaction level criteria by the computer vision technology using the means for capturing images and associate the behavior analysis with the RFID based data.

Furthermore, the present invention can analyze the segmentation of the customers, such as the demographic composition of the customers based on a demographic classification technology in computer vision using the means for capturing images and associate the demographic composition analysis with the RFID based data.

As shown in the exemplary embodiment in FIG. 2, there are areas that may not be covered by the means for capturing images, such as the areas outside the "area covered by the means for capturing images" 142. Within this area, the shopping path of the customer, such as the "track segment 1" 433, "track segment 3" 435, and "track segment 5" 437, is tracked only by the RFID tags based proximity detection and tracking method in the exemplary embodiment.

Each of the associations of the measurements in the shopping path of the customer can be correlated using the unique RFID tag identification. For example, the association of RFID with video-based measurements of a customer between the start time, Tin, at R1, and the end time, Tout, at R2 can be correlated with the association of RFID with video-based measurements of the same customer between the start time, Tin, at R5, and the end time, Tout, at R6, if the RFID tag identification for the same customer is sensed as identical by the means for sensing and using RFID tags 118, as shown in FIG. 2.

In the exemplary embodiment of the present invention shown in FIG. 2, the exemplary correlation of a plurality of such associations 270, in different locations and among different windows of time for the same person, helps:

to integrate the fragmented tracking segments by the plurality of means for capturing images that may not cover the retail space entirely but partially here and there, and to understand the customer's shopping behavior in the entire shopping path from one location to another location with the help of the RFID based proximity detection, even though the video-based tracking of the customer does not cover entire shopping path of the customer in the retail space.

Details of combining the video-based measurement data with the RFID tracking data are described hereinafter.

Figure 3:
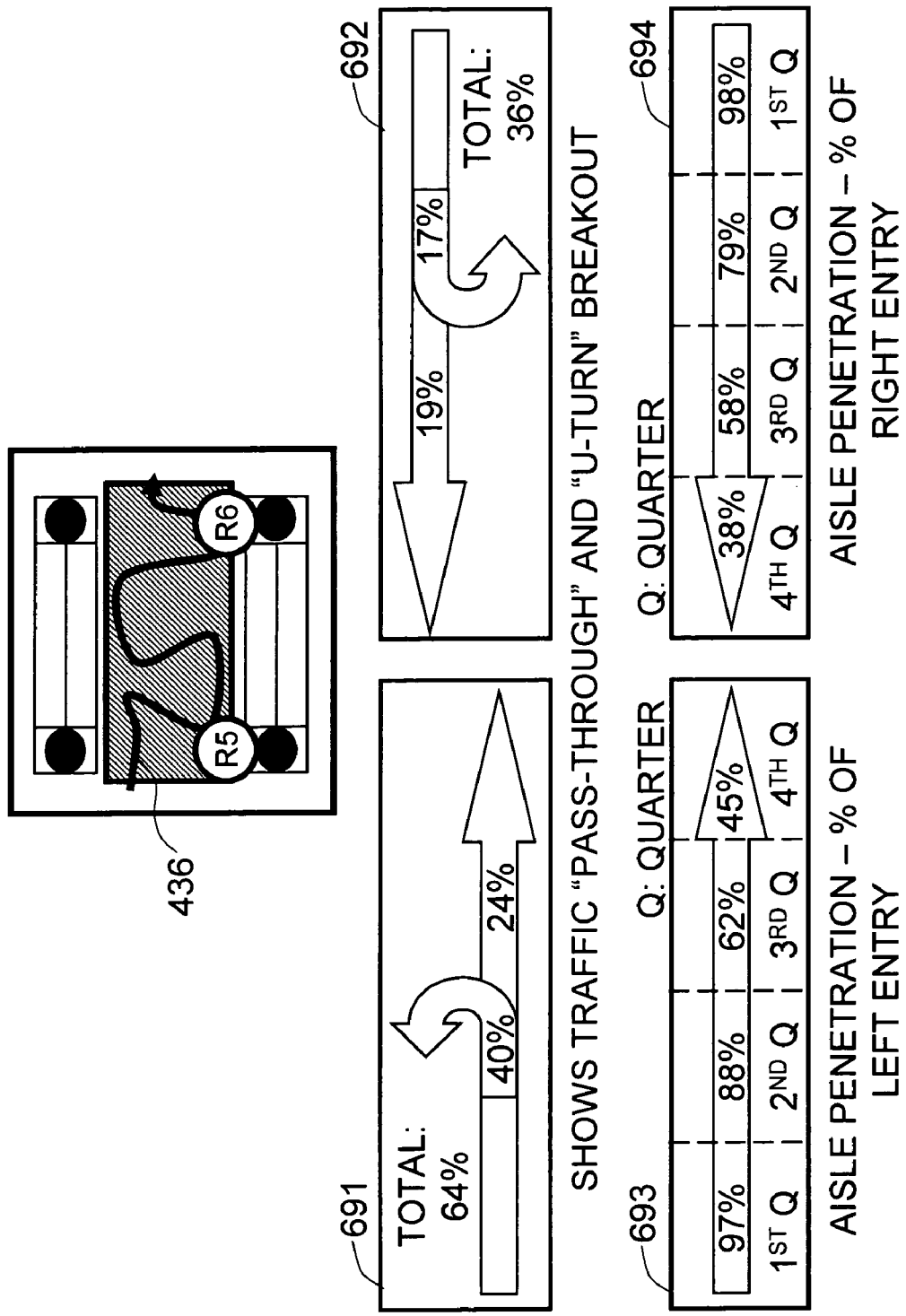
FIG. 3 shows exemplary details of the aisle dynamics within the area covered by vision-based behavior analysis in the present invention.

FIG. 3 shows exemplary details of the aisle dynamics within the "area covered by the means for capturing images" 142 for vision-based behavior analysis in the present invention. The vision-based behavior analysis can provide much finer details of the behavioral characteristics of the customer, which may not be easily possible by the RFID proximity detection based tracking, within the "area covered by the means for capturing images" 142.

The present invention can measure the traffic "pass-through" and "u-turn" breakout statistics based on the video-based tracking of the customers as shown in FIG. 3. In the exemplary embodiment shown in FIG. 3, the exemplary statistical data measurement for the 'traffic "pass-through" and "u-turn" breakout 1' 691 and 'traffic "pass-through" and "u-turn" breakout 2' 692 show that 64% of the customers entered the aisle from left and 36% of the customers entered the aisle from right. The 'traffic "pass-through" and "u-turn" breakout 1' 691 further shows that only 24% of the customers passed through the aisle and 40% of the customers made the "u-turn", among the customers who entered the aisle from left. Likewise, the 'traffic "pass-through" and "u-turn" breakout 2' 692 further shows that only 19% of the customers passed through the aisle and 17% of the customers made the "u-turn", among the customers who entered the aisle from right.

In the exemplary embodiment shown in FIG. 3, the exemplary statistical data measurement for the "aisle penetration 1" 693 and the "aisle penetration 2" 694 show exemplary aisle penetration percentage of left entry and right entry, respectively. The "aisle penetration 1" 693 further shows that 97% of the customers who entered from left penetrated $1^{st}$ quarter, 88% of the customers $2^{nd}$ quarter, 62% of the customers $3^{rd}$ quarter, and 45% of the customers $4^{th}$ quarter. Likewise, the "aisle penetration 2" 694 further shows that 98% of the customers who entered from right penetrated $1^{st}$ quarter, 79% of the customers $2^{nd}$ quarter, 58% of the customers $3^{rd}$ quarter, and 38% of the customers $4^{th}$ quarter.

Figure 4:
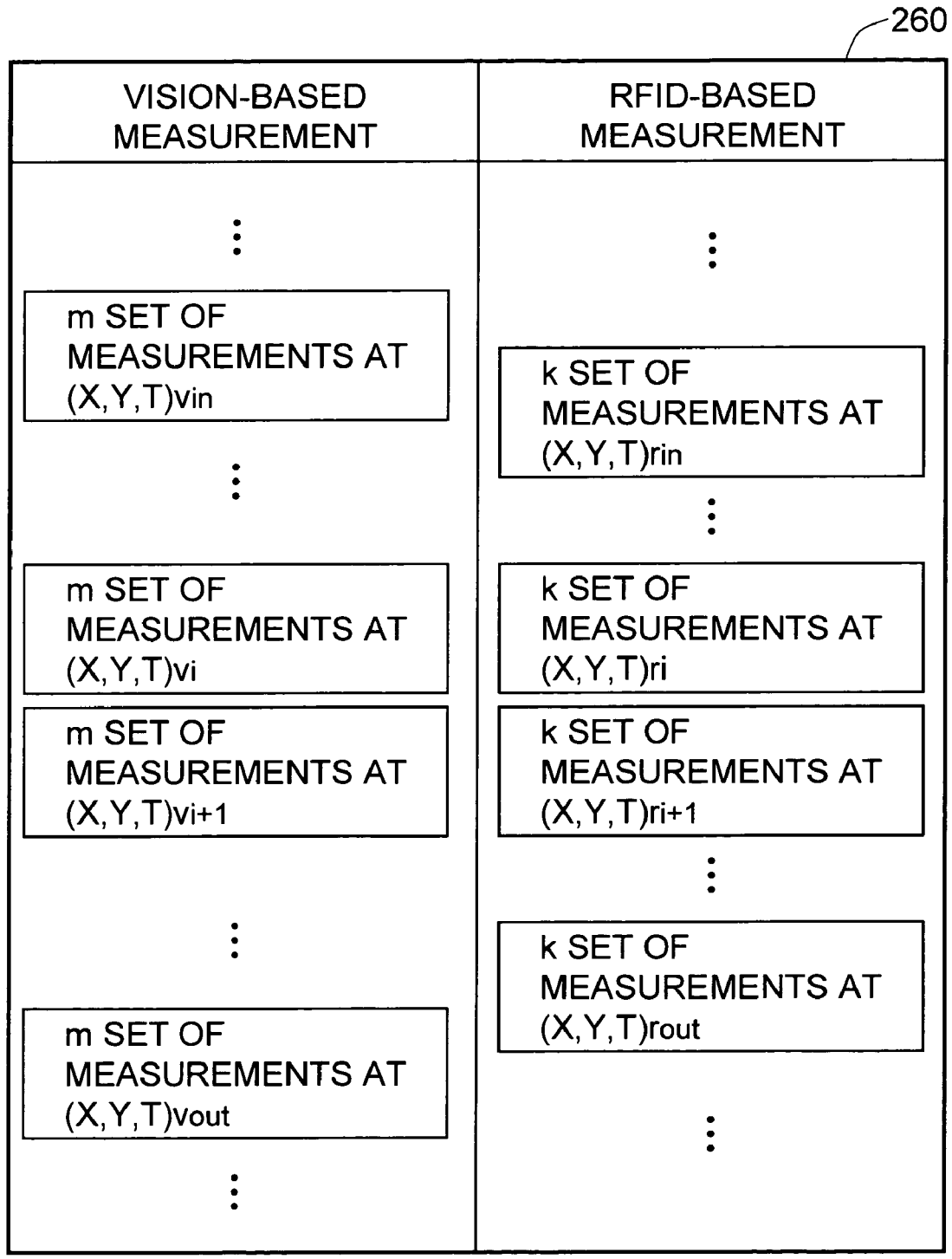
FIG. 4 shows an exemplary association of the computer vision based measurement with the RFID based measurement in an exemplary embodiment of the invention.

FIG. 4 shows an exemplary association of the computer vision based measurement with the RFID based measurement in an exemplary embodiment of the invention.

Combined Visual-RFID Tracking

As shown in the exemplary embodiment in FIG. 2, means for sensing and using RFID tags 118, such as RFID tag readers and antenna or coils, are installed throughout various locations in the store and a plurality of means for capturing images 100, such as video cameras, are installed in a few selected areas. Hereinafter, RFID tag reader refers to an exemplary means for sensing and using RFID tags, and camera refers to an exemplary means for capturing images. The type of the RFID tags in the present invention is not limited to any one of the three generally known types: passive, semi-passive, or active RFID tags.

The first step in combining the RFID and visual tracking information requires calibration information regarding each sensor. The location of each RFID tag reader is recorded in a coordinate system chosen to represent the entire store (for example, in meters, with the origin at some specific point within the store). For each camera, the focal length, CCD size, (x,y,z) position, and rotation information is stored. Using trigonometry, a mathematical relationship between coordinates in the camera's view, and the store coordinate system can be obtained. This relationship is then expressed as a function that can be used to transform any tracking information generated from a particular camera view into the same storewide coordinate system that contains information regarding the RFID sensor tags.

Each tag reader generates an event containing a timestamp and the unique RFID signature whenever an object with the RFID tag, such as a cart with the tag, passes by. In the following example, a person traveling with a cart that has the RFID tag is assumed. These timestamps can be used to recreate the path of the object with the RFID tag as it traveled throughout the store. All of these events are gathered together, and organized by signature, as shown in the following exemplary table 1:

TABLE 1

| RFID TAG #37 | | | | |
|---|---|---|---|---|
| 12:00:01 PM | 12:00:10 PM | 12:00:11 PM | 12:10:11 PM | 12:10:15 PM |
| READER 1 | READER 2 | READER 1 | READER 5 | READER 6 |

The reader information is then transformed into coordinate information as shown in the following exemplary table 2:

TABLE 2

| RFID TAG #37 | | | | |
|---|---|---|---|---|
| 12:00:01 PM | 12:00:10 PM | 12:00:11 PM | 12:10:11 PM | 12:10:15 PM |
| (10, 10) | (5, 5) | (10, 10) | (10, 15) | (10, 20) |

Now we have 2 sets of data: high resolution visual tracking information containing (x,y,t) coordinates of people, and lower resolution (x,y,t) information containing information about the location of the RFID tag in the carts. An exemplary table, a table for the "association of RFID data with video-based behavior and segmentation data" 260, for the 2 sets of such data is shown in FIG. 4.

There are four scenarios that are considered:
1) Cart outside of camera view, Person inside of camera view
2) Cart outside of camera view, Person outside of camera view In this scenario, tracking is performed entirely by following the RFID signature as it travels past the various tag readers. No association with visual tracking data is possible.
3) Cart inside of camera view, Person outside of camera view
4) Cart inside of camera view, Person inside of camera view Each visual track that falls within some distance d of an RFID track that exists at the same time is given a confidence value that represent the probability that it belongs to that track. The scoring is restricted to points where the cart has recently moved, because at these points there is a very high probability that the person being tracked visually is pushing the cart. Spatio-temporal constraints are used to eliminate unlikely pairings of visual tracks with the RFID paths throughout the store.

The scoring criteria for each RFID track is as follows:
1) Remove duplicate events indicative of when the cart is sitting still. For example, the following sequence: (POS1,t),(POS1,t+1),(POS1,t+2),(POS2,t+3),(POS2,t+4),(POS2,t+5) can be reduced to: (POS1,t),(POS1,t+2), (POS2,t+3),(POS2,t+5). The reduction is performed by checking to see if the position changed more than a predefined threshold, "thresh".
2) Examine the (xr,yr,t) information for each of the reduced location sequences. If the visual track also exists at time t, then extract the position information at that time (xv, yv) from the visual track.

3) The RFID information immediately before and after the start and end of the visual track is always considered for comparison purposes.

The non-Euclidean distance between the two points is calculated as being the shortest path between those points, and takes into account obstructions to shopper movement (shelves, walls, etc. . . . ).

The minimum required speed is the minimum speed that a person must have traveled to get from the start/end of the visual track to the prior/next RFID track position.

A table, such as the following exemplary table 3, is generated for each candidate RFID track.

TABLE 3

| RFID location/time (xr, yr, t) | Closest Visual location/time (xv, yv, t) | Non-Euclidean Distance | Minimum required speed |
|---|---|---|---|
| (0, 0, 0) | (5, 5, 10) | 20 | 2 |
| (5, 5, 5) | (5, 4, 5) | 1 | N/a |
| (10, 10, 10) | (9, 10, 10) | 1 | N/a |
| (40, 40, 100) | (20, 20, 80) | 60 | 3 |

If the minimum required speed to travel between 2 points is greater than the user-defined maximum speed (defined as a brisk walk), then the association of the RFID track is disregarded as being extremely unlikely or impossible.

The confidence value for matching a particular RFID track to a visual track is determined by the formula:

$$1 - \text{proximityError} \quad (1.1)$$

where the proximityError is defined by averaging the non-Euclidean distance scores in the above table, and then normalizing by dividing by a user-defined threshold, and ensuring that the resulting score falls within the range [0,1].

The RFID/visual track pairing with the highest confidence value is chosen, and the two tracks are now determined to represent the same individual.

FIG. 5~FIG. 8 show different exemplary embodiments of the present invention, which show various types of association among a plurality of data sources.

Figure 5:
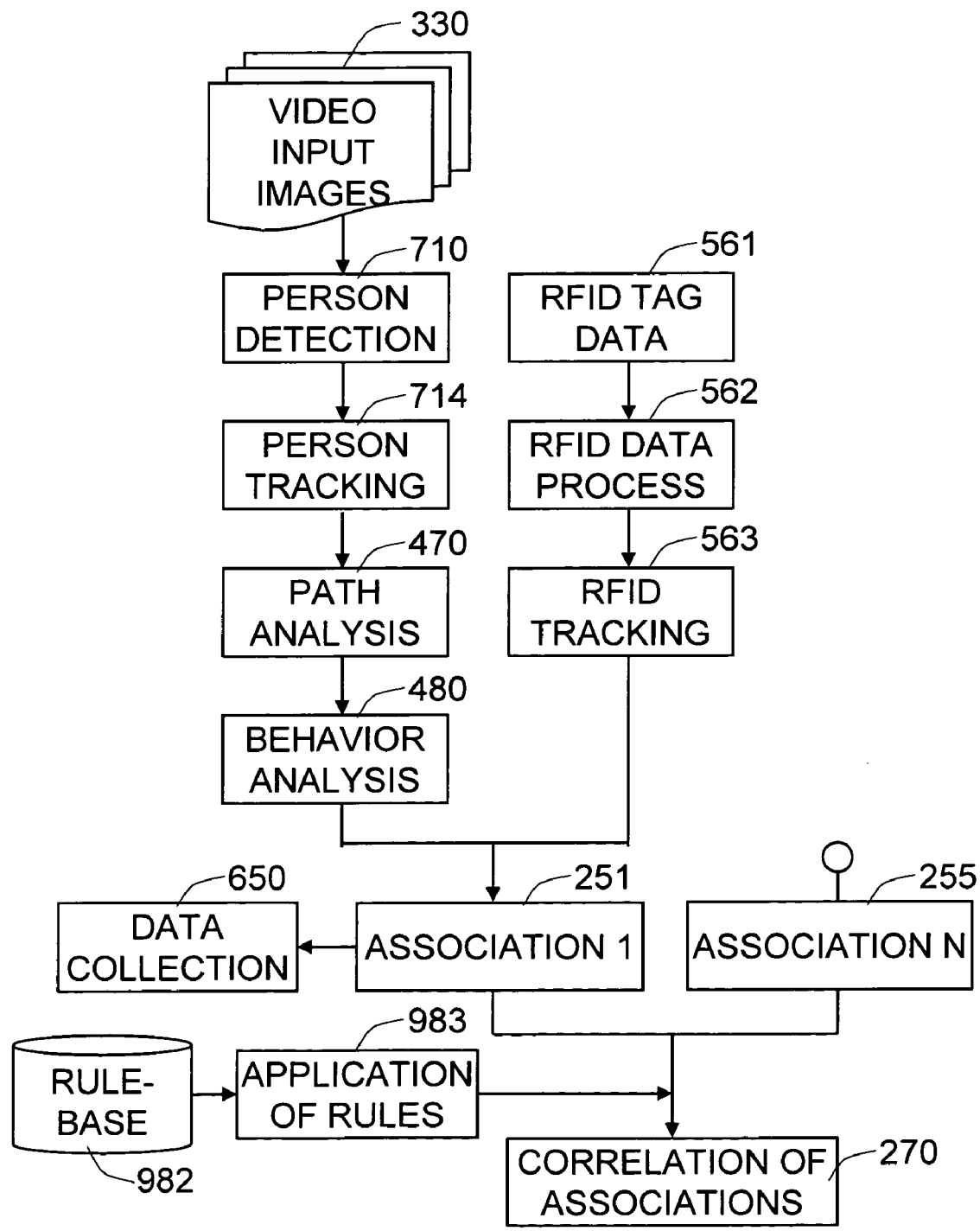
FIG. 5 shows an exemplary processes of associating the computer vision based behavior analysis with the RFID based measurement in an exemplary embodiment of the invention.

FIG. 5 shows an exemplary processes of associating the computer vision based behavior analysis with the RFID based measurement in an exemplary embodiment of the invention.

In the exemplary embodiment, the present invention detects 710 and tracks 714 a person, such as a customer, in the video input images 330, from a plurality of means for capturing images 100. The present invention can join the trajectories of the person tracks from a video of a means for capturing images 100 to another video of a means for capturing images 100, while the person appears and disappears between the fields of view among a plurality of means for capturing images 100. Based on the tracking information, the present invention performs the path analysis 470 of the particular person. The path analysis 470 can be used as one of the ways to process the behavior analysis 480 of the person and obtain useful information about the person's behavior, such as shopping behavior.

The present invention can utilize any reliable video-based tracking method for a single customer and a group of customers in the prior art in regards to the behavior analysis. For example, U.S. Provisional Pat. No. 60/833,031 of Sharma, et al. (hereinafter Sharma) disclosed an exemplary process of video-based tracking and behavior analysis for a single customer or a group of customers using multiple means for capturing images in a preferred embodiment of the invention.

The present invention processes 562 the RFID data, which was sensed by a plurality of RFID receivers, and tracks 563 the person based on the sequence of the RFID tag data 561 readings for the proximity detection.

The present invention then associates the RFID based tracking with the video-based tracking, through an association process, such as the "association 1" 251 process, as discussed above for Combined Visual-RFID Tracking, and the associated data can be stored in a database at the data collection process 650.

The present invention can correlate a plurality of associations, such as the "association 1" 251 and the "association N" 255, based on the unique RFID tag identification even if each of the plurality of associations was gathered discretely. The correlation of the associations 270 helps in understanding the person's entire shopping behavior even though the plurality of means for capturing images in the present invention may not cover the entire shopping path of the person.

The correlation can be achieved by applying 983 a set of predefined rules in a rule-base 982. For example, if a plurality of associations within a certain window of time contain the same unique RFID tag identification and the earliest timestamp and the latest timestamp among all of the associations fall into within the start time of the RFID tag identification at the entrance and the end time of the RFID tag identification at the counter for a transaction or exit, then the plurality of associations can be correlated as the partial associations within a entire shopping path for the same customer according to the time sequence.

For this embodiment, a general-purpose color video camera, both analog and digital, can be used as the means for capturing images 100 to deliver video frames to the computer via a USB, IEEE1394, or serial connection.

Figure 6:
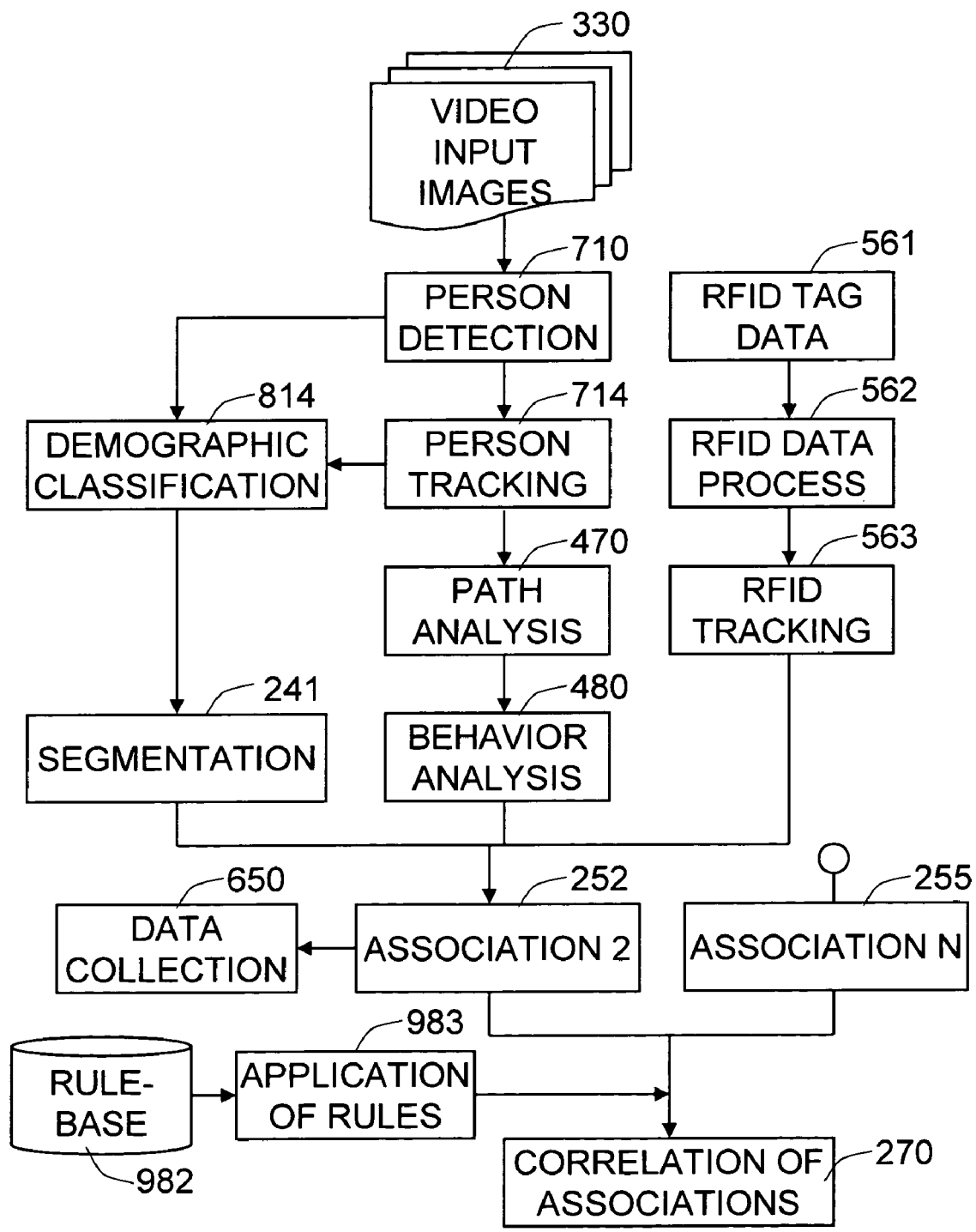
FIG. 6 shows an exemplary processes of associating the computer vision based segmentation measurement with the behavior analysis and RFID based measurement in an exemplary embodiment of the invention.

FIG. 6 shows an exemplary processes of associating the computer vision based segmentation measurement with the behavior analysis and RFID based measurement in an exemplary embodiment of the invention.

In the exemplary embodiment shown in FIG. 6, the present invention detects 710 and tracks 714 a person, such as a customer, in the video input images 330, from a plurality of means for capturing images 100. The present invention can join the trajectories of the person tracks from a video of a means for capturing images 100 to another video of a means for capturing images 100, while the person appears and disappears between the fields of view among a plurality of means for capturing images 100. Based on the tracking information, the present invention performs the path analysis 470 of the particular person. The path analysis 470 can be used as one of the ways to process the behavior analysis 480 of the person and obtain useful information about the person's behavior, such as shopping behavior.

The present invention can utilize any reliable video-based tracking method for a single customer and a group of customers in the prior art in regards to the behavior analysis, such as Sharma.

The present invention can also process segmentation 241 of the customer based on the images of the customer in the video. Demographic classification 814 is an exemplary segmentation 241 of the customer.

The present invention can utilize any reliable demographic composition measurement method in the prior art as an exemplary video-based segmentation of the customers. For example, U.S. Provisional Pat. No. 60/808,283 of Sharma, et al. (hereinafter Sharma 2) disclosed an exemplary demographic composition measurement based on gender and ethnicity.

The association of the segmentation data, such as the demographic measurement, with the RFID based tracking information and video-based behavior analysis of a customer provides deeper understanding for the relationship between the customers' shopping behavior analysis according to the demographic background of the customers.

For example, the segmentation 241 of the person can also help in understanding differences in aisle, section or shelf level behaviors across various shopper segments such as:

Shopper segments based on certain shopping trip characteristics

Shopper segments based on purchase habits or "basket" characteristics, and

Shopper segments based on existing loyalty card classifications.

The present invention processes 562 the RFID data, which was sensed by a plurality of RFID receivers, and tracks 563 the person based on the sequence of the RFID tag data 561 readings for the proximity detection.

The present invention then associates the RFID based tracking with the video-based tracking and segmentation 241, through an association process, such as the "association 2" 252 process, in a similar manner as discussed above for Combined Visual-RFID Tracking, and the associated data can be stored in a database at the data collection process 650.

The present invention can correlate a plurality of associations, such as the "association 2" 252 and the "association N" 255, based on the unique RFID tag identification even if each of the plurality of associations was gathered discretely. The correlation of the associations 270 helps in understanding the person's entire shopping behavior even though the plurality of means for capturing images in the present invention may not cover the entire shopping path of the person.

The correlation can be achieved by applying 983 a set of predefined rules in a rule-base 982. For example, if a plurality of associations within a certain window of time contain the same unique RFID tag identification and the earliest timestamp and the latest timestamp among all of the associations fall into within the start time of the RFID tag identification at the entrance and the end time of the RFID tag identification at the counter for a transaction or exit, then the plurality of associations can be correlated as the partial associations within a entire shopping path for the same customer according to the time sequence.

Figure 7:
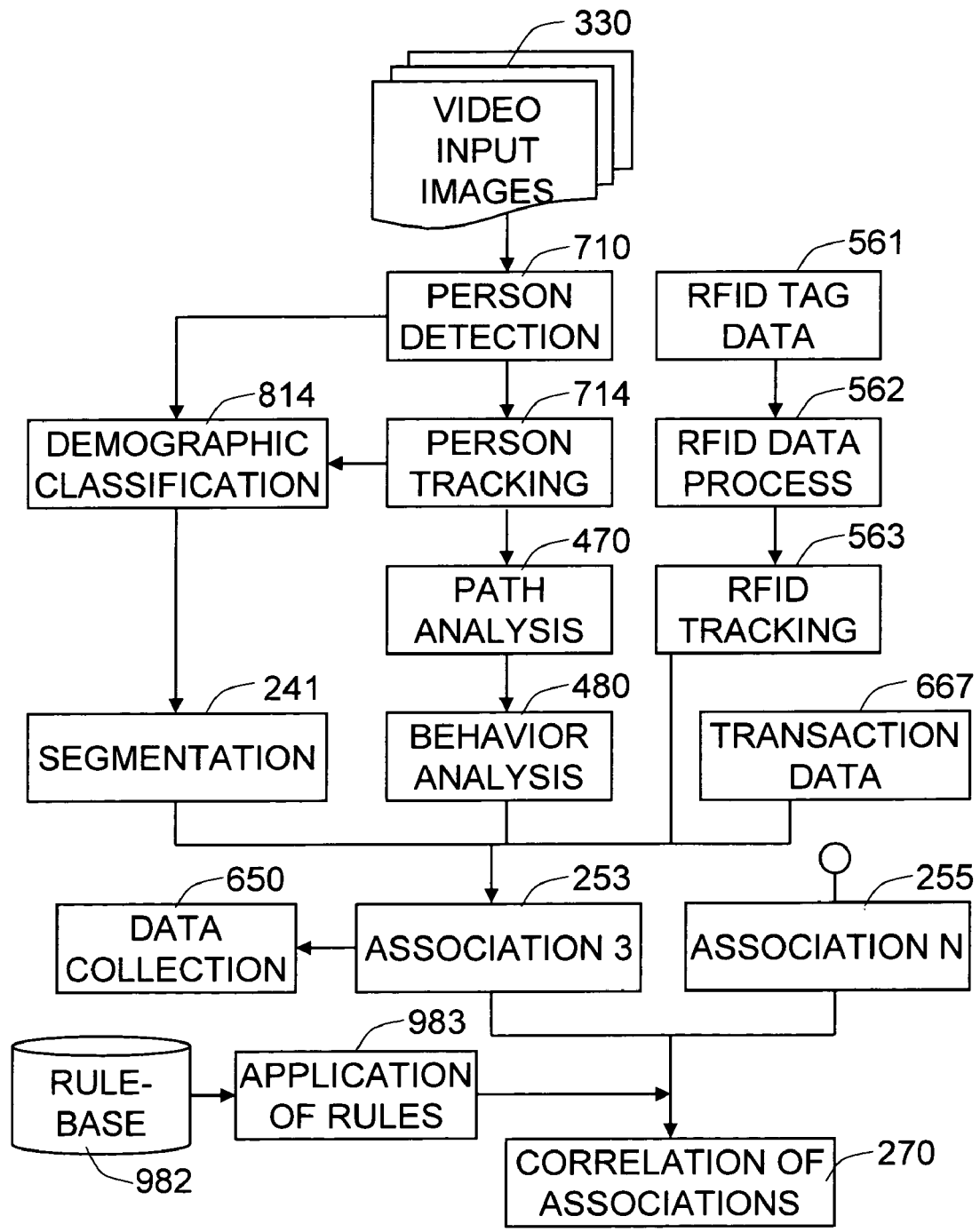
FIG. 7 shows an exemplary processes of associating transaction data with the computer vision based segmentation measurement and behavior analysis, and RFID based measurement in an exemplary embodiment of the invention.

FIG. 7 shows an exemplary processes of associating transaction data with the computer vision based segmentation measurement and behavior analysis, and RFID based measurement in an exemplary embodiment of the invention.

In the exemplary embodiment shown in FIG. 7, the present invention detects 710 and tracks 714 a person, such as a customer, in the video input images 330, from a plurality of means for capturing images 100. The present invention can join the trajectories of the person tracks from a video of a means for capturing images 100 to another video of a means for capturing images 100 while the person appears and disappears between the fields of view among a plurality of means for capturing images 100. Based on the tracking information, the present invention performs the path analysis 470 of the particular person. The path analysis 470 can be used as one of the ways to process the behavior analysis 480 of the person and obtain useful information about the person's behavior, such as shopping behavior.

The present invention can utilize any reliable video-based tracking method for a single customer and a group of customers in the prior art in regards to the behavior analysis, such as Sharma.

The present invention can also process segmentation 241 of the person, such as the demographic classification 814 of the person, based on the image of the person in the video. The present invention processes 562 the RFID data, which was sensed by a plurality of RFID receivers, and tracks 563 the person based on the sequence of the RFID tag data 561 readings for the proximity detection.

The present invention associates the RFID based tracking with the video-based tracking and segmentation 241, through an association process, such as the "association 3" 253 process, in a similar manner as discussed above for Combined Visual-RFID Tracking. In the exemplary embodiment, the "association 3" 253 process can also associate the RFID based tracking with the transaction data, and the associated data can be stored in a database at the data collection process 650.

The present invention can correlate a plurality of associations, such as the "association 3" 253 and the "association N" 255, based on the unique RFID tag identification even if each of the plurality of associations was gathered discretely. The correlation of the associations 270 helps in understanding the person's entire shopping behavior even though the plurality of means for capturing images in the present invention may not cover the entire shopping path of the person.

The correlation can be achieved by applying 983 a set of predefined rules in a rule-base 982. For example, if a plurality of associations within a certain window of time contain the same unique RFID tag identification and the earliest timestamp and the latest timestamp among all of the associations fall into within the start time of the RFID tag identification at the entrance and the end time of the RFID tag identification at the counter for a transaction or exit, then the plurality of associations can be correlated as the partial associations within a entire shopping path for the same customer according to the time sequence.

Figure 8:
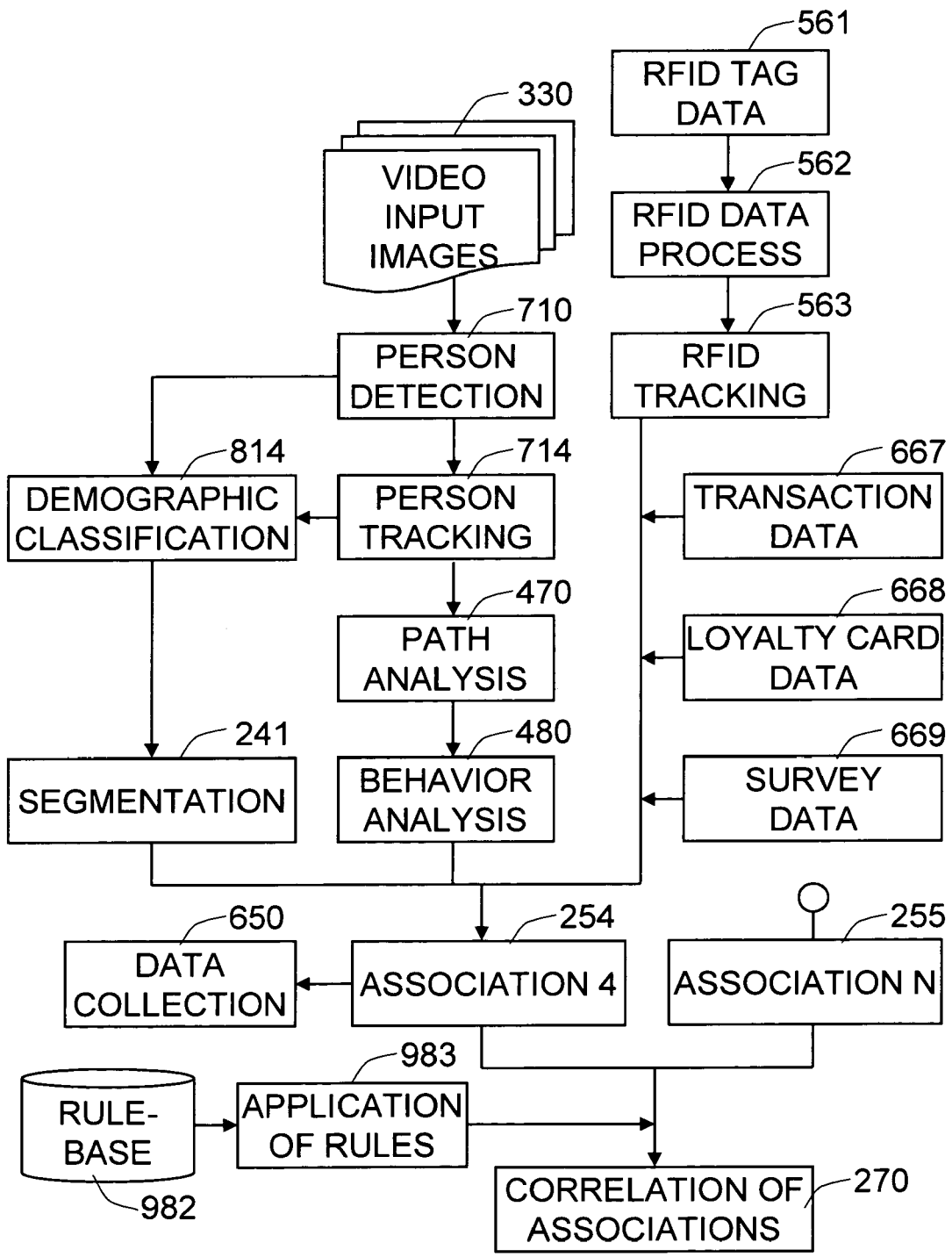
FIG. 8 shows an exemplary processes of associating exemplary time based measurement, such as loyalty card data or survey data, with the transaction data, computer vision based segmentation measurement and behavior analysis, and RFID based measurement in an exemplary embodiment of the invention.

FIG. 8 shows an exemplary processes of associating exemplary time based measurement, such as loyalty card data or survey data, with the transaction data, computer vision based segmentation measurement and behavior analysis, and RFID based measurement in an exemplary embodiment of the invention.

In the exemplary embodiment shown in FIG. 8, the present invention detects 710 and tracks 714 a person, such as a customer, in the video input images 330, from a plurality of means for capturing images 100. The present invention can join the trajectories of the person tracks from a video of a means for capturing images 100 to another video of a means for capturing images 100 while the person appears and disappears between the fields of view among a plurality of means for capturing images 100. Based on the tracking information, the present invention performs the path analysis 470 of the particular person. The path analysis 470 can be used as one of the ways to process the behavior analysis 480 of the person and obtain useful information about the person's behavior, such as shopping behavior.

The present invention can utilize any reliable video-based tracking method for a single customer and a group of customers in the prior art in regards to the behavior analysis, such as Sharma.

The present invention can also process segmentation 241 of the person, such as the demographic classification 814 of the person, based on the image of the person in the video. The present invention processes 562 the RFID data, which was sensed by a plurality of RFID receivers, and tracks 563 the person based on the sequence of the RFID tag data 561 readings for the proximity detection.

The present invention associates the RFID based tracking with the video-based tracking and segmentation 241, through an association process, such as the "association 4" 254 process, in a similar manner as discussed above for Combined Visual-RFID Tracking. In the exemplary embodiment, the "association 4" 254 process can also associate the RFID based tracking with the transaction data, or any time-based measurement that could provide meaningful information for the person's shopping behavior, such as loyalty card data 668 or survey data 669, and the associated data can be stored in a database at the data collection process 650.

The present invention can correlate a plurality of associations, such as the "association 4" 254 and the "association N" 255, based on the unique RFID tag identification even if each of the plurality of associations was gathered discretely. The correlation of the associations 270 helps in understanding the person's entire shopping behavior even though the plurality of means for capturing images in the present invention may not cover the entire shopping path of the person.

The correlation can be achieved by applying 983 a set of predefined rules in a rule-base 982. For example, if a plurality of associations within a certain window of time contain the same unique RFID tag identification and the earliest timestamp and the latest timestamp among all of the associations fall into within the start time of the RFID tag identification at the entrance and the end time of the RFID tag identification at the counter for a transaction or exit, then the plurality of associations can be correlated as the partial associations within a entire shopping path for the same customer according to the time sequence.

FIG. 9 shows an exemplary RFID tags proximity detection based tracking and its relationship with the video-based measurement in an exemplary embodiment of the present invention.

As discussed above for Combined Visual-RFID Tracking in regards to FIG. 4, means for sensing and using RFID tags 118, such as RFID tag readers, are installed throughout various locations in the retail space, and a plurality of means for capturing images 100, such as video cameras, are also installed in a few selected areas. The exemplary embodiment shown in FIG. 9 shows two RFID tag readers, installed in the vicinity of the aisle entry points. Each tag reader generates an event containing a timestamp and the unique RFID signature whenever the customer passes by the proximate area where the readers are installed with an "object with RFID tag" 119, such as a cart with a RFID tag, as shown in the "relationship between video-based measurement and RFID tags proximity detection based tracking 1" 272 in FIG. 9.

In addition, as shown in the "relationship between video-based measurement and RFID tags proximity detection based tracking 2" 273 in FIG. 9, the means for capturing images 100 can track the customer regardless of the location of the RFID tagged object, within the area covered by the means for capturing images, thus providing more detailed shopping interaction measurement for the customer even if the customer may leave the cart alone temporarily.

FIG. 10 shows exemplary tables of a plurality of RFID tracking information for customers during an exemplary window of time. The exemplary "table for RFID tracking 1" 564 and "table for RFID tracking 2" 565 shown in FIG. 10 show the RFID tracking during window of time W1 and Wp, respectively. In the exemplary tables, each row string contains similar information as that of the Table 2 in regards to the customer who carries an "object with RFID tag" 119, such as a cart with a RFID tag. FIG. 11 shows an exemplary "string of RFID tracking information" 566 for a customer during an exemplary window of time, which could comprise RFID tag ID number, receiver ID number, receiver location information, and timestamp, based on the RFID proximity detection.

FIG. 12 shows an exemplary shopping interaction levels in a retail space that can be used as a criteria for the behavioral analysis of the customers using the computer vision based tracking in regards to the association with the RFID proximity detection.

The shopping interaction levels can be defined by a decision maker in a retail space based on the spatio-temporal relations. For example, the "table for shopping interaction levels" 938 divides the customer shopping interaction into "passing by", "noticing", "stopping", from "engaging 1" to "engaging P-1", and "purchase". They are labeled as "level 1" interaction, "level 2" interaction, "level 3" interaction, from "level 4" interaction to "level P-1" interaction, and "level p" interaction, respectively. Notice the engaging interaction can be further divided into multiple engaging levels depending on the level of engaging defined by a particular retail space.

Based on the measured coordinates and time information in the tracking of a customer, the customers' behavior can be mapped to the predefined shopping interaction levels. For example, if the coordinates of a customer's shopping path stays within a certain area for more than a predefined threshold time, then we can map the customer's interaction to one of the interaction levels based on the amount of time spent in the area.

As discussed above in regards to FIG. 3, the vision-based behavior analysis can provide much finer details of the behavioral characteristics of the customer, which may not be easily possible by the RFID proximity detection based tracking, within the "area covered by the means for capturing images" 142, and the exemplary shopping interaction levels can be an example of the finer behavior analysis information that the present invention can provide. This process not only complements the RFID proximity detection based tracking in the finer detailed level, but also enriches the information that the present invention can provide in regards to the association of the both technology.

FIG. 13 shows an exemplary statistics of the behavioral analysis information for each predefined section in a retail space.

In the exemplary embodiment, as shown in the exemplary "table of behavior class measurement for section 1" 610 and "table of behavior class measurement for section N" 611, the characterizations are provided for a given window of time, such as from Tn−1 to Tn, and the present invention details a section's behavioral statistics for that time increment. Each window of time, such as from Tn−1 to Tn, and the entire duration of the measurement period from T1 to Tn can be decided based on various business goals and levels of desired information composition for the section in the retail space.

Statistical collection of the behavior analyses, such as the exemplary mappings of the shopping interaction levels shown in FIG. 12 into the predefined classes, can provide valuable marketing information to the owner of the present invention in the relevant retail space. Especially, it helps in analyzing a specific business element, such as each predefined section of the retail space.

Figure 14:
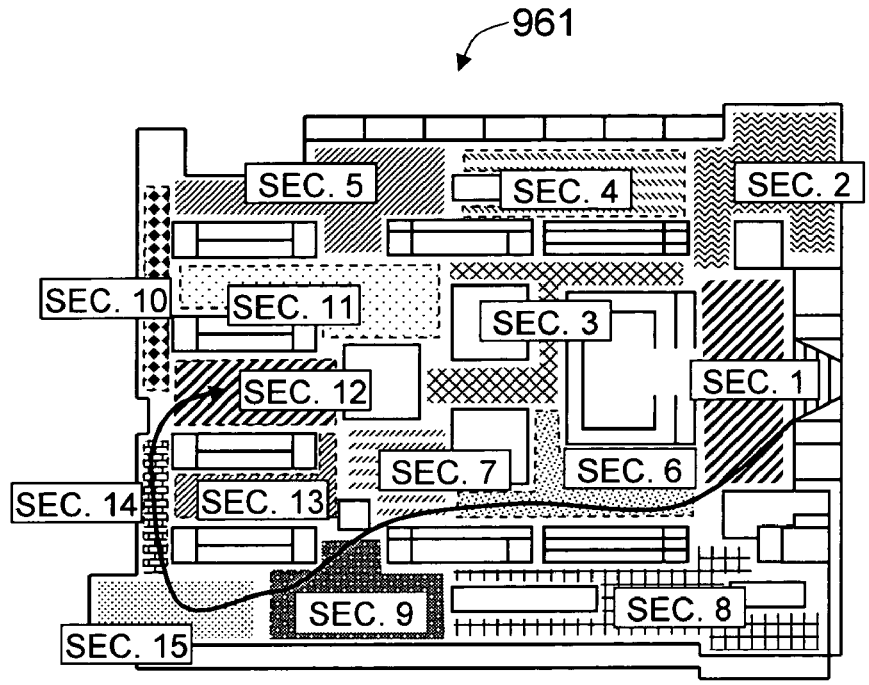
FIG. 14 shows an exemplary layout of a plurality of sections in a retail space and an exemplary table for section sequence measurement among the plurality of sections as an exemplary analysis of the plurality of sections based on the association of the RFID proximity detection based tracking and behavior analysis by the video-based tracking.

FIG. 14 shows an exemplary layout of a plurality of sections in a retail space and an exemplary table for section sequence measurement among the plurality of sections as an exemplary analysis of the plurality of sections based on the association of the RFID proximity detection based tracking and behavior analysis by the video-based tracking.

In the present invention, the "section" is a logically defined entity, such as a group of products, a group of product types, space, an area in a store, a group of areas in a store, a display of a group of products, or a department with similar items. Thus, a section is not necessarily a spatial single entity, which means a section can consist of multiple distributed retail spaces. The exemplary "layout of sections" 961 shows an exemplary plurality of sections in a retail space, according to the definition, based on a typical business goals in the retail space.

The present invention can correlate various customer behaviors and shopping interaction levels, based on the association of the RFID proximity detection based tracking and the video-based tracking, to the predefined sections. A list of some such exemplary correlations for the behavior analysis are as follows:

1) Maps: Display of quantitative measurement for overall shopping behavior,
2) Quantitative Measurement per Section, such as a ratio between shopping interaction levels, level 2 over level 1, in a section,
3) Dominant Path Measurement, which implies specific decision pattern because a finite number of next regions to choose from a "location A" defines the number of direction from that specific location and shows the tendency/preference of customers' decision for the next path,
4) Section Correlation of shopping paths for optimal distance between sections, and
5) Section Sequence, which includes the order of engagement.

The table for section sequence 965 is an exemplary embodiment of a table that measures sequence relationship among a plurality of sections. For example, the first row of the table shows that there were "394 customers" who visited section 2, "514 customers" who visited section 3, and "130 customers" who visited section 4 after visiting section 1. The 2-dimensional arrays of values in the table for section sequence 965 in FIG. 14 show the measured counts for the adjacent sections that the customers immediately visited right after visiting a section in the leftmost column of the table. However, the length of the section sequences can be extended further. In another exemplary embodiment of the table for section sequence, the table can measure three sequences of sections the customers visited one by one, using 3-dimensional arrays of values.

FIG. 15 shows an exemplary shopping behavior measurement, based on the association of the RFID proximity detection based tracking and the video-based tracking, among a plurality of sections in a retail space during a plurality of different windows of time through a plurality of exemplary tables for the behavior measurement.

Each row in the exemplary tables shows a string of behavior measurement for a customer during a window of time. In the exemplary tables in FIG. 15, the "Table for Behavior Measurement 1" 486 is an exemplary behavior measurement for the customers at the window of time W1 and the "Table for Behavior Measurement 2" 487 is an exemplary behavior measurement for the customers at the window of time Wp, among the sections, section 1 to section N.

In the exemplary table, each element in the string of behavior measurement for a customer can be a n-tuple, consisting of n objects for the behavior measurement, such as section number, interaction level, product identification, coordinate, timestamp, information with regard to the means for capturing images, and so on. For example, the string of behavior measurement for the customer 1 in the "Table for Behavior Measurement 1" 486 consists of (C1, PB, P1), (C2, PB, P2), (C3, L2, P3), . . . , (C4, PB, P4), where C1, C2, C3, and C4 mean section numbers, PB means passing-by interaction, L2 means level 2 interaction, and P1, P2, P3, and P4 mean product identifications. In another exemplary row, the string of behavior measurement for the customer 2 in the "Table for Behavior Measurement 1" 486 consists of (C1, PB, P1), (C3, L2, P3), (C2, PB, P2), . . . , (C4, PB, P4), (C5, L3, P5), where C1, C2, C3, C4, and C5 mean section numbers, PB means passing-by interaction, L2 means level 2 interaction, L3 means level 3 interaction, P1, P2, P3, P4, and P5 mean product identifications. Therefore, the second 3-tuple element, (C3, L2, P3), in the string means that the customer 2 was in the section 3, and the customer's behavior was measured as level 2 interaction, while the customer approached the product P3 at the section 3 after the customer previously visited the section 1 and passed by the section 1 where the product P1 is located.

In the exemplary tables in FIG. 15, the number of customers per table can be various, and a customer in one table does not necessarily mean the same customer as another customer in another table just because both of them are designated by the same customer ID because the ID could have been possibly designated for two different customers during different windows of time.

However, as discussed above, the plurality of strings of behavior measurement can be correlated through the unique RFID tag identification. The string of behavior measurements and the string of RFID tracking information in the shopping path of the customer are associated, and a plurality of the associations can be correlated using the unique RFID tag identification. Thus, if a customer in one table has the same unique RFID tag identification as another customer in another table during a predefined time frame threshold and between the RFID tag identification's one cycle, from the entrance to exit, there is a higher probability that the customers could be recognized as one identical customer in the correlation process.

In addition to the number of customers, the starting time, ending time, and length of the string of behavior measurement for each of the multiple customers during a window of time can be various because the customers appear and disappear in the field of view of the means for capturing images in different patterns.

Based on the plurality of exemplary tables for behavior measurement and accumulated statistics for the customer behavioral patterns, various behavior analyses are possible. For example, the present invention can provide maps, which display quantitative measurements for overall shopping behavior and paths. In the exemplary embodiment of the maps, the present invention can use color-coded symbolic expressions to differentiate the behavior characterization among a plurality of behavior characterizations at the retail space. The present invention can also provide quantitative measurement per section based on the accumulated statistics per sections, such as a ratio between shopping interaction levels, level 3 over level 2. For example, if the counts for (C5, L2, P5) are approximately 4 times larger than that of (C5, L3, P5), we can learn that about 25% of the customers at section 5 moved from level 2 interaction to level 3 interaction for product P5.

In another exemplary behavior analysis, the present invention can calculate the percentage of visits per each section compared to all the visits to sections after the customer approached a specific product, such as 10% for section 2, 11% for section 3, and so on after the customer approached the product at the section 1 during the window of time W1. In this example, the order of visits is not taken into consideration.

However, in another exemplary behavior analysis, the present invention can also calculate the percentage of visits for the sections that the customer visited first, right after the customer approached a specific product, such as 30% of the customers first visited the section 1 right after approaching the product, 20% of the customers first visited the section 2 right after approaching the product, and so on. Likewise, the present invention can also calculate the last section visit statistics right before the customers approach the product.

In addition to these analyses for the sequence and ordering of the sections, in another exemplary behavior analysis, the present invention can also calculate the correlation among the sections. For example, the present invention can count the number of n-tuple sections the customer visited before or after approaching a particular product, such as the number of visits for the 2-tuple sections, i.e. a pair of sections. For example, [(C1, PB, P1), (C2, PB, P2),], [(C1, PB, P1), (C3, PB, P3),], [(C1, PB, P1), (C4, PB, P4),], [(C2, PB, P2), (C3, PB, P3),], [(C2, PB, P2), (C4, PB, P4),], and [(C3, PB, P3), (C4, PB, P4),] can be the exemplary 2-tuple sections based on the 4 elements out of all the elements in a string of behavior measurement for a customer's shopping path. In this measurement, the value of n in the n-tuple and the total number of sections, denoted as Ntc, can be decided by the decision maker in a particular retail space. For example, the total number of sections, Ntc, can be decided based on the available number of adjacent sections from a product. Then the number of ways of grouping the un-ordered n-tuples among the total number of sections, Ntc, becomes a simple process for calculating a binomial coefficient, which is "Ntc C n: Ntc choose n".

In another exemplary behavior analysis, the present invention can also calculate the dominant direction, which the customer took after visiting a certain section, based on the statistics. For example, if the percentage of [(C1, PB, P1), (C2, PB, P2),] is 60%, [(C1, PB, P1), (C3, PB, P3),] is 30%, and [(C1, PB, P1), (C4, PB, P4),] is 10%, we can learn a behavioral tendency in which more customers prefer the path toward section 2 rather than paths toward section 3 or 4, after visiting the section 1.

FIG. 16 shows exemplary statistics of the demographic information for each predefined section in a retail space in regards to the association with the RFID proximity detection based tracking and video-based behavior analysis. The demographic measurement, previously mentioned as an exemplary video-based segmentation in regards to FIG. 6, can be accumulated and provide statistical information about the demographic composition of the customers in each section of the retail space. In the exemplary embodiment, as shown in the exemplary "Table of demographic composition for section 1" 612 and "Table of demographic composition for section N" 613, the characterizations can be provided for a given window of time, such as from Tn−1 to Tn, based on the statistical measurement for the demographic composition, and the present invention details the demographics for that time increment. Each window of time, such as from Tn−1 to Tn, and the entire duration of the measurement period from T1 to Tn, can be decided based on various business goals and level of desired information composition in the retail space.

As said, the association of the segmentation data, such as the demographic measurement and statistics, with the RFID based tracking and video-based behavior analysis of a customer provides deeper understanding for the relationship between the customers' shopping behavior analysis according to the demographic background of the customers, especially in each target section.

FIG. 17 shows an exemplary table for the transaction and loyalty data that can be associated with the behavior analysis in the present invention. The date, time and lane number in the exemplary table can provide the information to link a transaction with the corresponding shopping trip and behavior data in the present invention. The member ID number can also allow classification of the transaction by lifestyle group.

Figure 18:
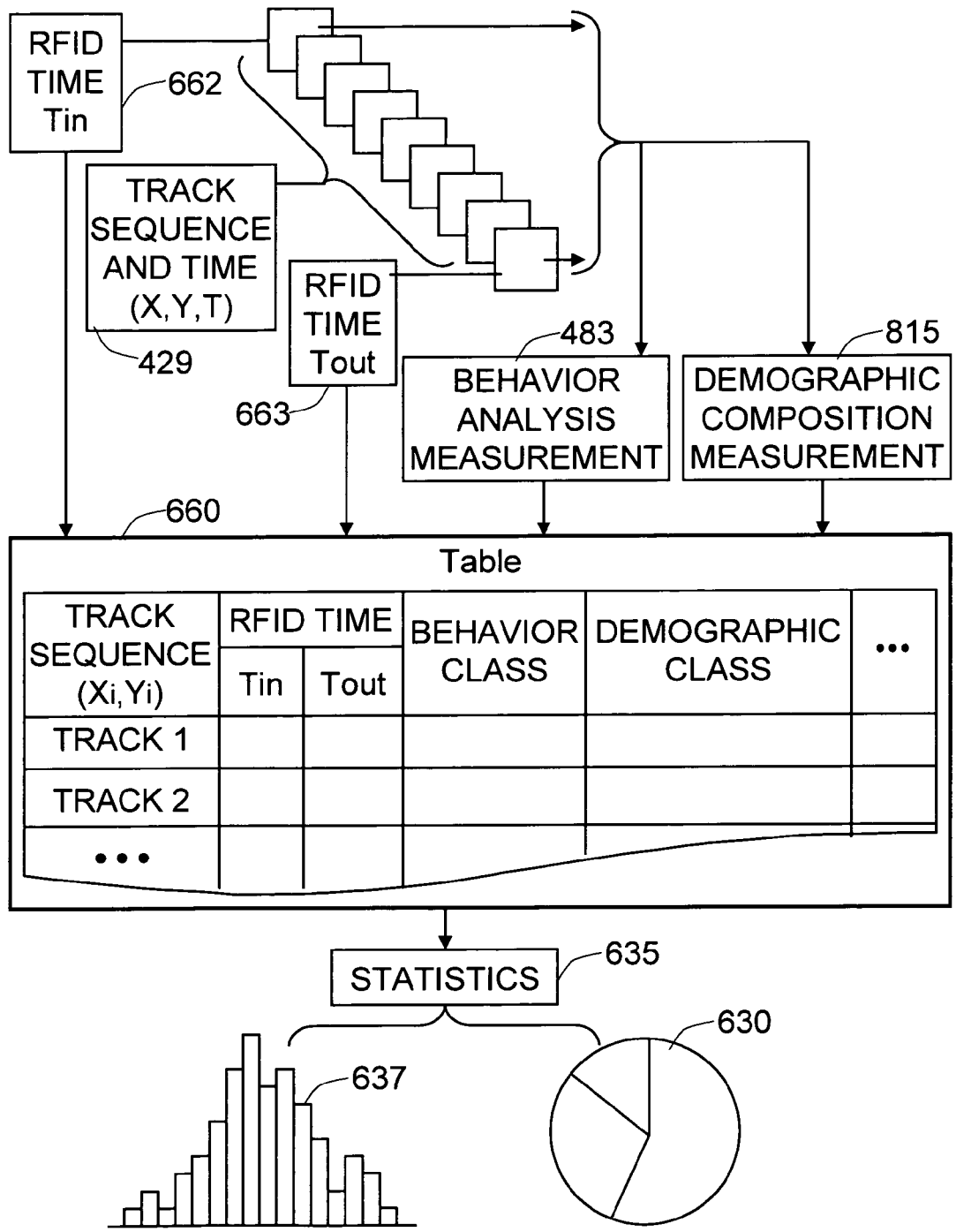
FIG. 18 shows an exemplary data storage process in an exemplary embodiment of the present invention.

FIG. 18 shows an exemplary data storage process in an exemplary embodiment of the present invention. In the exemplary embodiment, the system can store the data in a table 660, where each track has fields of values: exemplary attributes can be time stamps (start time and end time of the video-based tracking sequence 429, associated RFID Time Tin and Tout, for person appearance and disappearance in a particular section), behavior class by the behavior analysis measurement 483 process, demographic class by the demographic composition measurement 815 process, and so on. The exemplary data can be used to collect statistics 635 of the behavior analysis and demographic composition of the customers, and the statistics 635 can be represented as a pie chart 630, as a bar graph 637, or any data representation means in the exemplary embodiment. The data is accessible by the programming module, so that the system can directly and automatically utilize the statistical data for the characterization of the sections in the retail space.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for analyzing shopping behavior of a plurality of persons in a retail space by associating RFID data with video-based behavior analysis data using a computer vision based behavior analysis and segmentation technology performed on a computer, comprising the following steps of:
   a) capturing a plurality of input images of the plurality of persons by a plurality of means for capturing images,
   b) processing the plurality of input images in order to analyze the behavior of the plurality of persons in each field of view of the plurality of means for capturing images, by applying a plurality of computer vision technologies on the plurality of input images, wherein the plurality of computer vision technologies comprise face detection, person tracking, body parts detection, and demographic classification,
   c) sensing RFID tag data utilizing a plurality of means for sensing and using RFID tag,
   d) associating the video-based behavior analysis data of the plurality of persons with the RFID tag data, and
   e) correlating a plurality of associations for each person, in the plurality of persons, in different locations and different windows of time to have an entire tracking of the shopping path for the person,
   wherein the correlation integrates fragmented video tracking segments into the entire tracking of the shopping path from one location to another location with a help of proximity detection using the associated RFID tag data, and
   wherein the RFID tag data comprise time, location, and identification of the RFID tag at the time they were sensed by the plurality of means for sensing and using RFID tag.

2. The method according to claim 1, wherein the method further comprises a step of associating segmentation data of the plurality of persons with the RFID tag data and the video-based behavior analysis data, whereby the segmentation data comprises demographic classification of the plurality of persons.

3. The method according to claim 1, wherein the method further comprises a step of associating a transaction data in the retail space with the RFID tag data, the video-based behavior analysis data, and a segmentation data of the plurality of persons, whereby the segmentation data comprises demographic classification of the plurality of persons.

4. The method according to claim 1, wherein the method further comprises a step of associating a temporal data with the RFID tag data, the video-based behavior analysis data, and a segmentation data of the plurality of persons, whereby the temporal data comprises loyalty card data or survey data.

5. The method according to claim 1, wherein the method further comprises a step of analyzing a plurality of sections in the retail space based on the association of the video-based behavior analysis data with the RFID tag data, which produces quantitative measurement per section, dominant path measurement among the sections, section correlation measurement for optimal distance between the sections, and section sequence measurement, wherein a section is defined as a logical entity, including a group of products, a group of product types, space, areas in a store, display of a group of products, or department with similar relevance.

6. The method according to claim 5, wherein the method further comprises a step of analyzing demographic characteristics of the plurality of persons with regard to the sections in the retail space, whereby the demographic characteristics comprise age, gender, and ethnicity information.

7. The method according to claim 1, wherein the method further comprises a step of analyzing details of aisle dynamics within area covered by vision-based behavior analysis, whereby the aisle dynamics comprise traffic pass-through and u-turn breakout, and aisle penetration.

8. An apparatus for analyzing shopping behavior of a plurality of persons in a retail space by associating RFID data with video-based behavior analysis data using a computer vision based behavior analysis and segmentation technology performed on a computer, comprising:

a) means for capturing a plurality of input images of the plurality of persons by a plurality of means for capturing images, b) means for processing the plurality of input images in order to analyze the behavior of the plurality of persons in each field of view of the plurality of means for capturing images, by applying a plurality of computer vision technologies on the plurality of input images, wherein the plurality of computer vision technologies comprise face detection, person tracking, body parts detection, and demographic classification, c) means for sensing RFID tag data utilizing a plurality of means for sensing and using RFID tag, d) means for associating the video-based behavior analysis data of the plurality of persons with the RFID tag data, and e) means for correlating a plurality of associations for each person, in the plurality of persons, in different locations and different windows of time to have an entire tracking of the shopping path for the person, wherein the correlation integrates fragmented video tracking segments into the entire tracking of the shopping path from one location to another location with a help of proximity detection using the associated RFID tag data, and wherein the RFID tag data comprise time, location, and identification of the RFID tag at the time they were sensed by the plurality of means for sensing and using RFID tag.

9. The apparatus according to claim 8, wherein the apparatus further comprises means for associating segmentation data of the plurality of persons with the RFID tag data and the video-based behavior analysis data, whereby the segmentation data comprises demographic classification of the plurality of persons.

10. The apparatus according to claim 8, wherein the apparatus further comprises means for associating a transaction data in the retail space with the RFID tag data, the video-based behavior analysis data, and a segmentation data of the plurality of persons, whereby the segmentation data comprises demographic classification of the plurality of persons.

11. The apparatus according to claim 8, wherein the apparatus further comprises means for associating a temporal data with the RFID tag data, the video-based behavior analysis data, and a segmentation data of the plurality of persons, whereby the temporal data comprises loyalty card data or survey data.

12. The apparatus according to claim 8, wherein the apparatus further comprises means for analyzing a plurality of sections in the retail space based on the association of the video-based behavior analysis data with the RFID tag data, which produces quantitative measurement per section, dominant path measurement among the sections, section correlation measurement for optimal distance between the sections, and section sequence measurement, wherein a section is defined as a logical entity, including a group of products, a group of product types, space, areas in a store, display of a group of products, or department with similar relevance.

13. The apparatus according to claim 12, wherein the apparatus further comprises means for analyzing demographic characteristics of the plurality of persons with regard to the sections in the retail space, whereby the demographic characteristics comprise age, gender, and ethnicity information.

14. The apparatus according to claim 8, wherein the apparatus further comprises means for analyzing details of aisle dynamics within area covered by vision-based behavior analysis, whereby the aisle dynamics comprise traffic pass-through and u-turn breakout, and aisle penetration.

* * * * *